(12) United States Patent
Akiba

(10) Patent No.: US 12,412,505 B2
(45) Date of Patent: Sep. 9, 2025

(54) CIRCUIT DEVICE AND DISPLAY SYSTEM

(71) Applicant: SEIKO EPSON CORPORATION, Tokyo (JP)

(72) Inventor: Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/511,005

(22) Filed: Nov. 16, 2023

(65) Prior Publication Data
US 2024/0169886 A1 May 23, 2024

(30) Foreign Application Priority Data
Nov. 17, 2022 (JP) .................................. 2022-183787

(51) Int. Cl.
G09G 3/20 (2006.01)

(52) U.S. Cl.
CPC ... *G09G 3/2096* (2013.01); *G09G 2310/0221* (2013.01); *G09G 2310/08* (2013.01)

(58) Field of Classification Search
CPC .......................... G09G 3/2096; G09G 2310/08
See application file for complete search history.

(56) References Cited

U.S. PATENT DOCUMENTS

| | | | | |
|---|---|---|---|---|
| 5,166,801 A * | 11/1992 | Yoshikawa | .............. | H04N 9/12 348/383 |
| 5,734,446 A * | 3/1998 | Tokoro | ..................... | H04N 9/31 348/588 |
| 6,961,347 B1 * | 11/2005 | Bunton | .................... | H04L 25/14 370/465 |
| 8,582,028 B2 * | 11/2013 | Zeng | ........................ | H04N 5/44 345/1.3 |
| 10,205,996 B2 | 2/2019 | Oh | | |
| 2007/0081735 A1 * | 4/2007 | Wada | .................... | H04N 19/117 382/250 |
| 2007/0097016 A1 * | 5/2007 | McGowan | ............... | G09G 5/12 345/1.3 |
| 2008/0055189 A1 * | 3/2008 | Wilk | ..................... | G06F 3/1446 345/1.3 |

(Continued)

FOREIGN PATENT DOCUMENTS

| | | |
|---|---|---|
| JP | 2006-174051 A | 6/2006 |
| JP | 2010-182926 A | 8/2010 |

(Continued)

*Primary Examiner* — Benyam Ketema
(74) *Attorney, Agent, or Firm* — Harness, Dickey & Pierce, P.L.C.

(57) ABSTRACT

A circuit device includes an image splitting circuit, a first output terminal group to an n-th output terminal group, and a switching circuit. The image splitting circuit splits input image data into first image data and second image data. The switching circuit allocates the first image data to any i output terminal groups among the first output terminal group to the n-th output terminal group, and outputs the first image data from the i output terminal groups to a first display. The switching circuit allocates the second image data to any j output terminal groups among output terminal groups obtained by excluding the i output terminal groups from the first output terminal group to the n-th output terminal group, and outputs the second image data from the j output terminal groups to a second display.

14 Claims, 22 Drawing Sheets

(56) References Cited

U.S. PATENT DOCUMENTS

| | | | |
|---|---|---|---|
| 2010/0177016 A1* | 7/2010 | Zeng | G06F 3/1431 |
| | | | 345/1.1 |
| 2010/0177017 A1* | 7/2010 | Zeng | G06F 3/1446 |
| | | | 345/1.1 |
| 2011/0242425 A1* | 10/2011 | Zeng | H04N 5/268 |
| | | | 348/E5.057 |
| 2017/0352307 A1* | 12/2017 | Arai | G06F 3/1446 |
| 2022/0036851 A1 | 2/2022 | Yasue | |
| 2022/0165194 A1 | 5/2022 | Akiba | |
| 2023/0047492 A1* | 2/2023 | Lin | G09G 5/005 |

FOREIGN PATENT DOCUMENTS

| | | |
|---|---|---|
| JP | 2022-025330 A | 2/2022 |
| JP | 2022-084155 A | 6/2022 |
| JP | 2022-125166 A | 8/2022 |

\* cited by examiner multi stream transport single stream transport

FIG. 12
ARRANGEMENT A
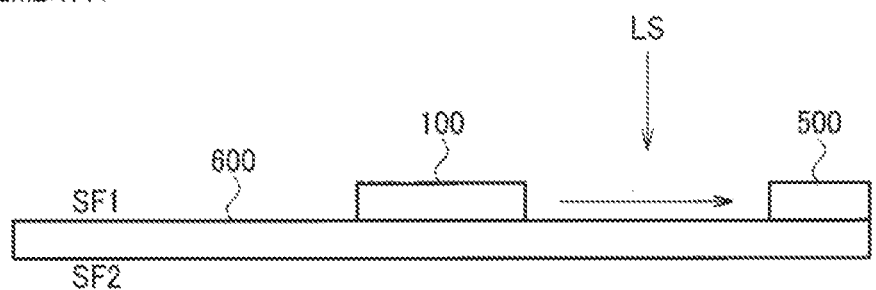
ARRANGEMENT B
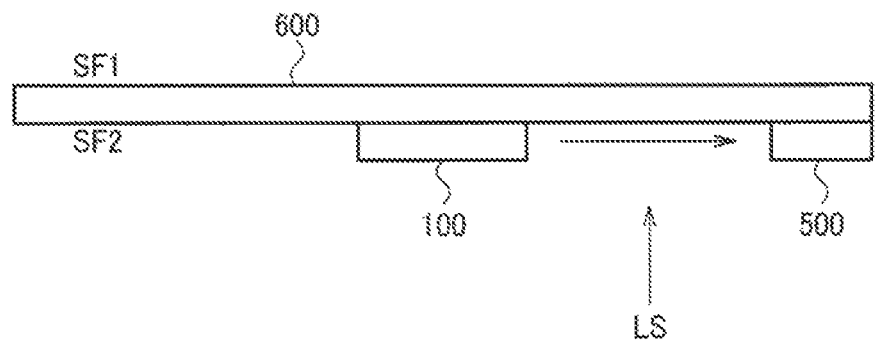

FIG. 14
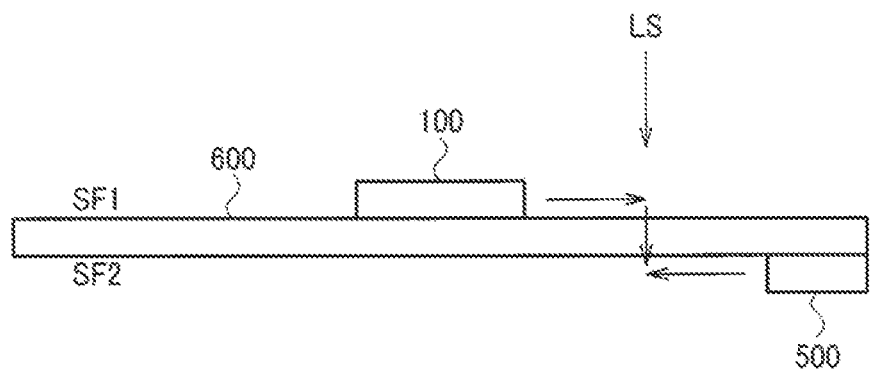
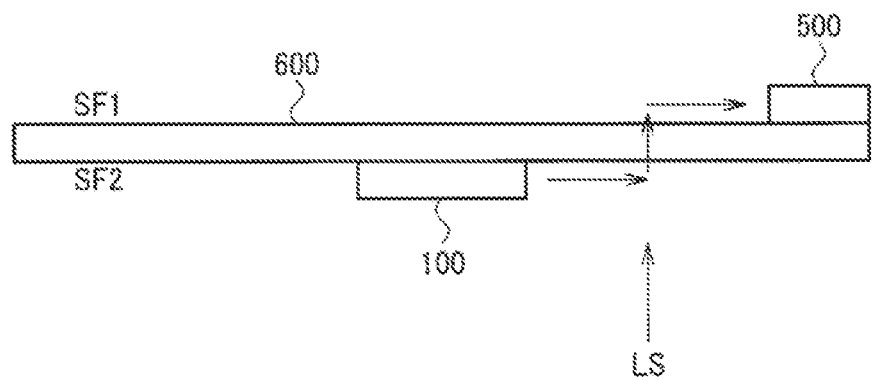

CIRCUIT DEVICE AND DISPLAY SYSTEM

The present application is based on, and claims priority from JP Application Serial Number 2022-183787, filed Nov. 17, 2022, the disclosure of which is hereby incorporated by reference herein in its entirety.

BACKGROUND

1. Technical Field

The present disclosure relates to a circuit device, a display system, and the like.

2. Related Art

JP-A-2022-125166 discloses an image processing device that splits an image. The image processing device includes an input unit, a splitting unit, and two output units. The input unit acquires input image data obtained by combining first image data and second image data. The splitting unit generates first intermediate image data and second intermediate image data by splitting the input image data. A first output unit outputs first output image data to a first display, and a second output unit outputs second output image data to a second display.

Although displays with various resolutions may be used, when image data is to be transmitted to the displays, data rates required in the transmission are different depending on the resolutions of the displays. Since the number of output terminals of image data changes depending on a data rate, it is necessary to prepare a custom circuit device corresponding to a resolution of a display. Alternatively, since it is necessary to prepare a circuit device having the number of output terminals corresponding to a maximum resolution of a display that may be coupled, a chip size increases. JP-A-2022-125166 describes two output units, but does not describe an output terminal, and does not disclose how to provide an output terminal for each display.

SUMMARY

An aspect of the present disclosure relates to a circuit device. The circuit device includes: an image splitting circuit configured to split input image data into first image data to be displayed on a first display and second image data to be displayed on a second display; a first output terminal group to an n-th output terminal group, n being an integer of 3 or more; and a switching circuit configured to allocate the first image data and the second image data to the first output terminal group to the n-th output terminal group, in which the switching circuit is configured to allocate the first image data to any i output terminal groups among the first output terminal group to the n-th output terminal group, and output the first image data from the i output terminal groups to the first display, i being an integer of 1 or more and n−1 or less, and allocate the second image data to any j output terminal groups among output terminal groups obtained by excluding the i output terminal groups from the first output terminal group to the n-th output terminal group, and output the second image data from the j output terminal groups to the second display, j being an integer of 1 or more and n−i or less.

Another aspect of the present disclosure relates to a display system including the above-described circuit device, a processing device configured to transmit the input image data to the circuit device, the first display, and the second display.

BRIEF DESCRIPTION OF THE DRAWINGS

FIG. 12 shows a first arrangement example of the circuit device and a connector on a board.

FIG. 14 shows a second arrangement example of the circuit device and the connector on the board.

DESCRIPTION OF EMBODIMENTS

Hereinafter, preferred embodiments of the present disclosure will be described in detail. Embodiments to be described below are not intended to limit contents described in the claims, and all components described in the embodiments are not necessarily essential components.

1. Display System and Circuit Device

Figure 1:
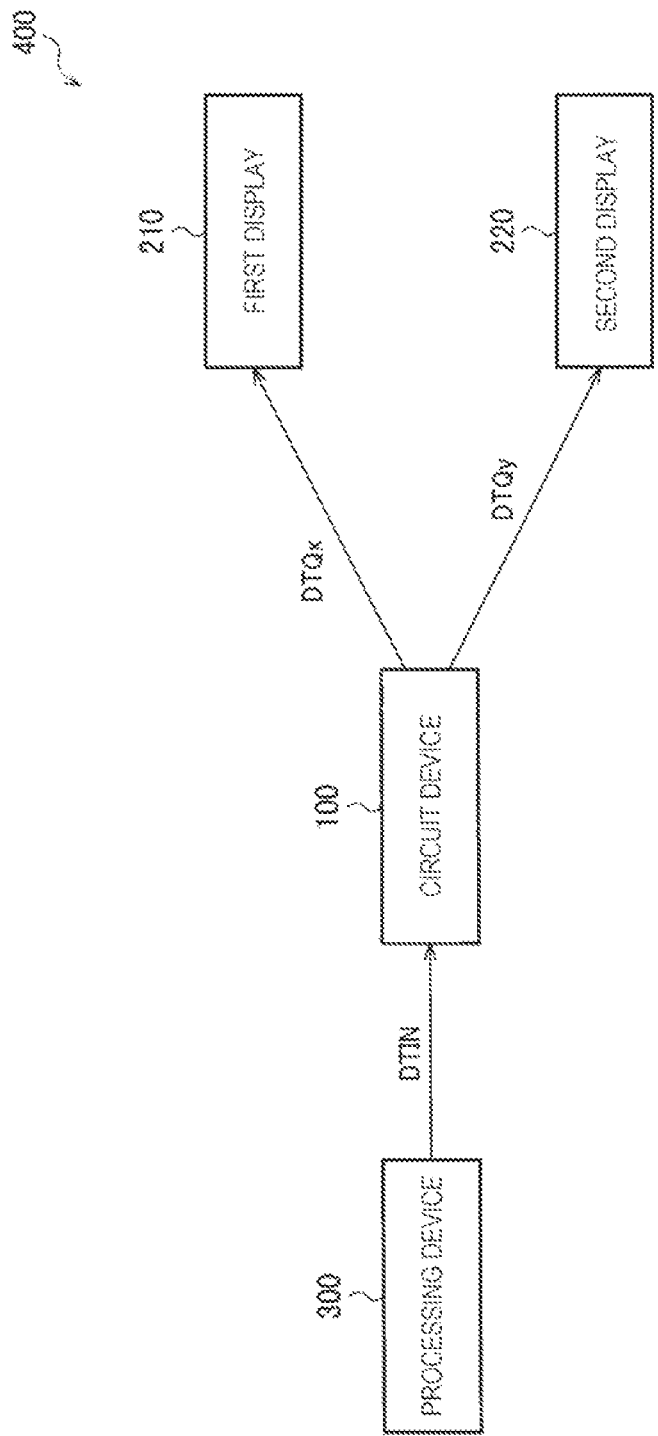
FIG. 1 shows a configuration example of a display system.

FIG. 1 shows a configuration example of a display system. A display system 400 includes a processing device 300, a circuit device 100, a first display 210, and a second display 220. The display system 400 may include any number of two or more displays.

The processing device 300 transmits input image data DTIN to the circuit device 100. The input image data DTIN includes first image data to be displayed on the first display 210 and second image data to be displayed on the second display 220. A method of transporting the input image data DTIN may be either single stream transport or multi stream transport, which will be described later. The processing device 300 is a processor such as a central processing unit (CPU), a microcomputer, a digital signal processor (DSP), an application specific integrated circuit (ASIC), or a field programmable gate array (FPGA).

The circuit device 100 splits the input image data DTIN received from the processing device 300 into the first image data and the second image data. The circuit device 100 transmits the first image data as transmission image data DTQx with one or more channels to the first display 210, and transmits the second image data as transmission image data DTQy with one or more channels to the second display 220. For example, when the circuit device 100 has outputs in four channels as in a configuration example shown in FIG. 2, the circuit device 100 allocates the first image data to any number of channels among the four channels and allocates the second image data to any number of channels among the remaining channels. This allocation can be freely changed. For example, when first to third channels are allocated to the first display 210 and a fourth channel is allocated to the second display 220, transmission image data DTQ1 to DTQ3 is DTQx and transmission image data DTQ4 is DTQy. The allocation of displays and channels is set according to, for example, a resolution of each display or a design of a board on which the display system 400 is mounted. The circuit device 100 is, for example, an integrated circuit device in which a plurality of circuit elements are integrated on a semiconductor board.

The first display 210 and the second display 220 may be any display device. For example, when the display system 400 is mounted in a vehicle, the display device is a cluster panel, a navigation display, or a head up display. The display device includes, for example, a display controller, a display driver, a display panel, and backlight. Alternatively, when the display device is a head up display, the display device further includes a projection optical system. A resolution of the second display 220 may be the same as or may be different from a resolution of the first display 210.

Figure 2:
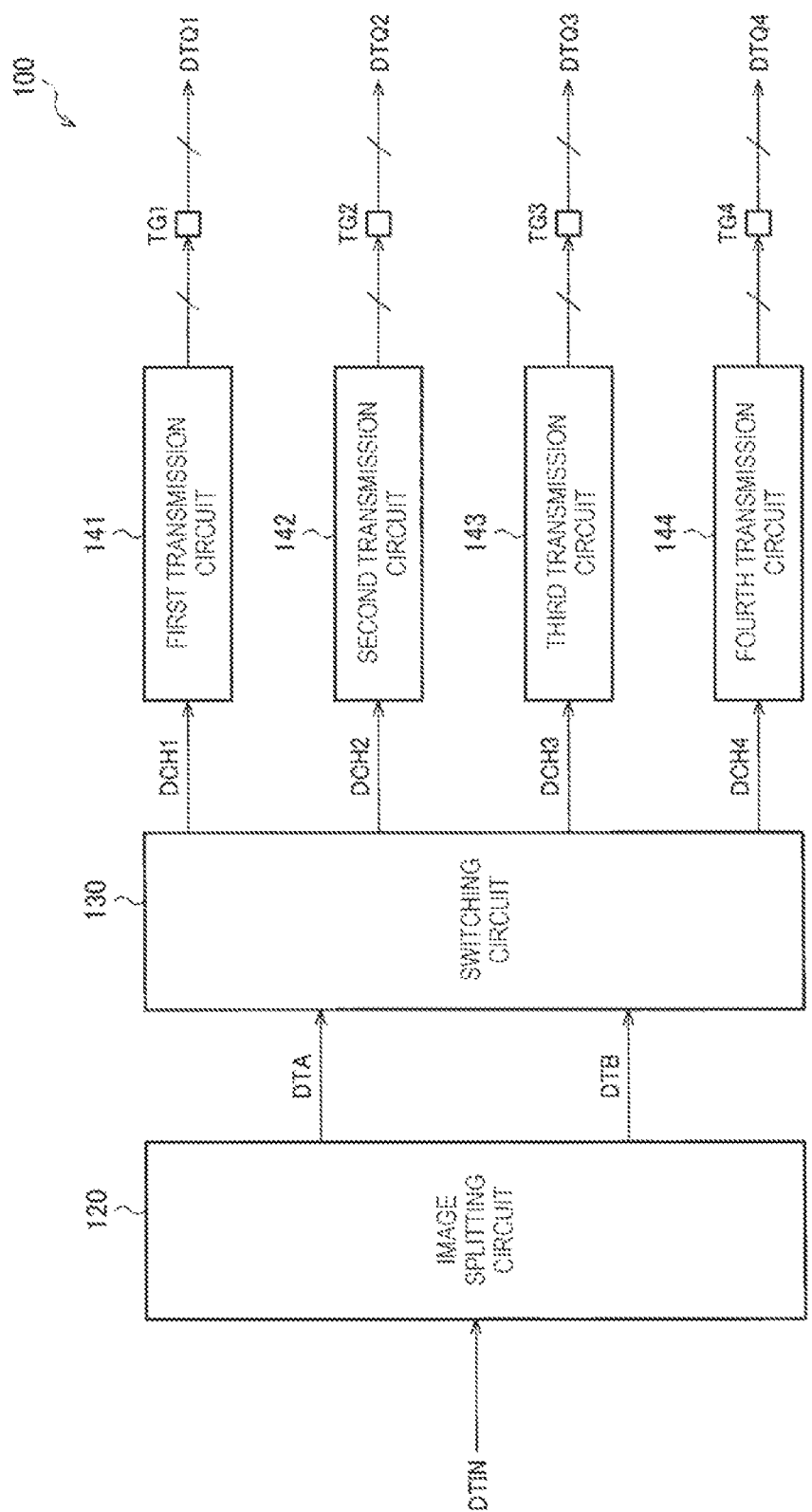
FIG. 2 shows a configuration example of a circuit device.

FIG. 2 shows a configuration example of the circuit device. The circuit device 100 includes an image splitting circuit 120, a switching circuit 130, first to fourth transmission circuits 141 to 144, and first to fourth output terminal groups TG1 to TG4. Each terminal of the circuit device 100 is a terminal provided in a package that accommodates a semiconductor board, or a pad provided on a semiconductor board. The circuit device 100 may include first to n-th transmission circuits. Although FIG. 2 shows an example in which n=4, n may be an integer of 3 or more. The circuit device 100 may further include a buffer, an image processing circuit, or the like provided between the image splitting circuit 120 and the switching circuit 130.

The image splitting circuit 120 receives the input image data DTIN and splits the received input image data DTIN into first image data DTA and second image data DTB. The image splitting circuit 120 includes, for example, an interface circuit that receives the input image data DTIN and a splitting circuit that splits the input image data DTIN received by a receiving circuit into the first image data DTA and the second image data DTB. Alternatively, the image splitting circuit 120 may be an interface circuit that receives the input image data DTIN, and the interface circuit may split the input image data DTIN into the first image data DTA and the second image data DTB in a process of reception processing. An interface between the processing device 300 and the image splitting circuit 120 may be an image interface of various standards, and may be, for example, an open LVDS display interface (open LDI), a display port, or a mobile industry processor interface display serial interface 2 (MIPI DSI-2).

The image splitting circuit 120 receives the input image data DTIN from the processing device 300 through multi stream transport (MST) or single stream transport. For example, the input image data DTIN is assumed to be transported through one cable in one port or channel, but is not limited thereto.

Figure 3:
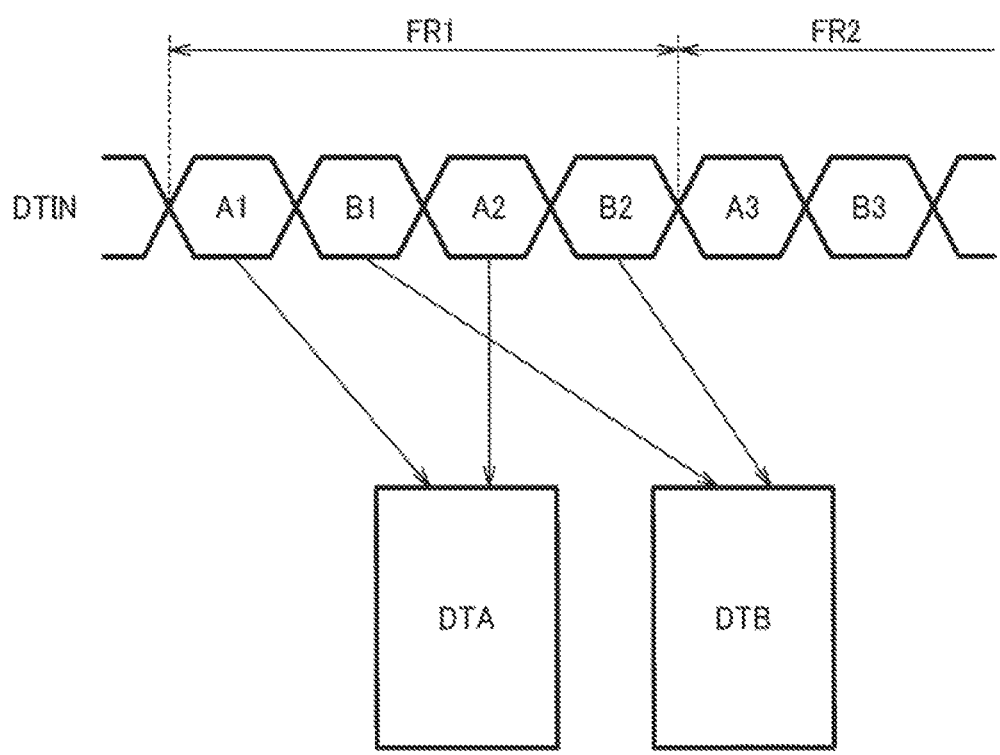
FIG. 3 is a diagram showing image splitting in multi stream transport.

FIG. 3 is a diagram showing image splitting in multi stream transport. The input image data DTIN includes a plurality of packets A1, B1, A2, and B2 as data of a frame FR1. Each of the packets A1 and A2 includes information for specifying the first display 210. Data obtained by combining data included in the packet A1 and data included in the packet A2 includes the first image data DTA. Each of the packets B1 and B2 includes information for specifying the second display 220. Data obtained by combining data included in the packet B1 and data included in the packet B2 includes the second image data DTB. The image splitting circuit 120 analyzes each packet, acquires the first image data DTA from the packets A1 and A2 for specifying the first display 210, and acquires the second image data DTB from the packets B1 and B2 for specifying the second display 220. Although FIG. 3 shows an example in which a packet for specifying the first display 210 and a packet for specifying the second display 220 are alternately transmitted, the packets may not be alternately transmitted. The number of packets for transmitting image data of one frame is not limited to the number shown in the example of FIG. 3.

An example of an image interface capable of performing multi stream transport is a display port. In this standard, a plurality of displays are coupled in series by a daisy chain, and a data stream including mixed packets respectively addressed to the displays is transmitted to the daisy chain. Each display acquires image data from a packet addressed to the display and displays the image data. However, the image interface of the multi stream transport is not limited to the display port.

Figure 4:
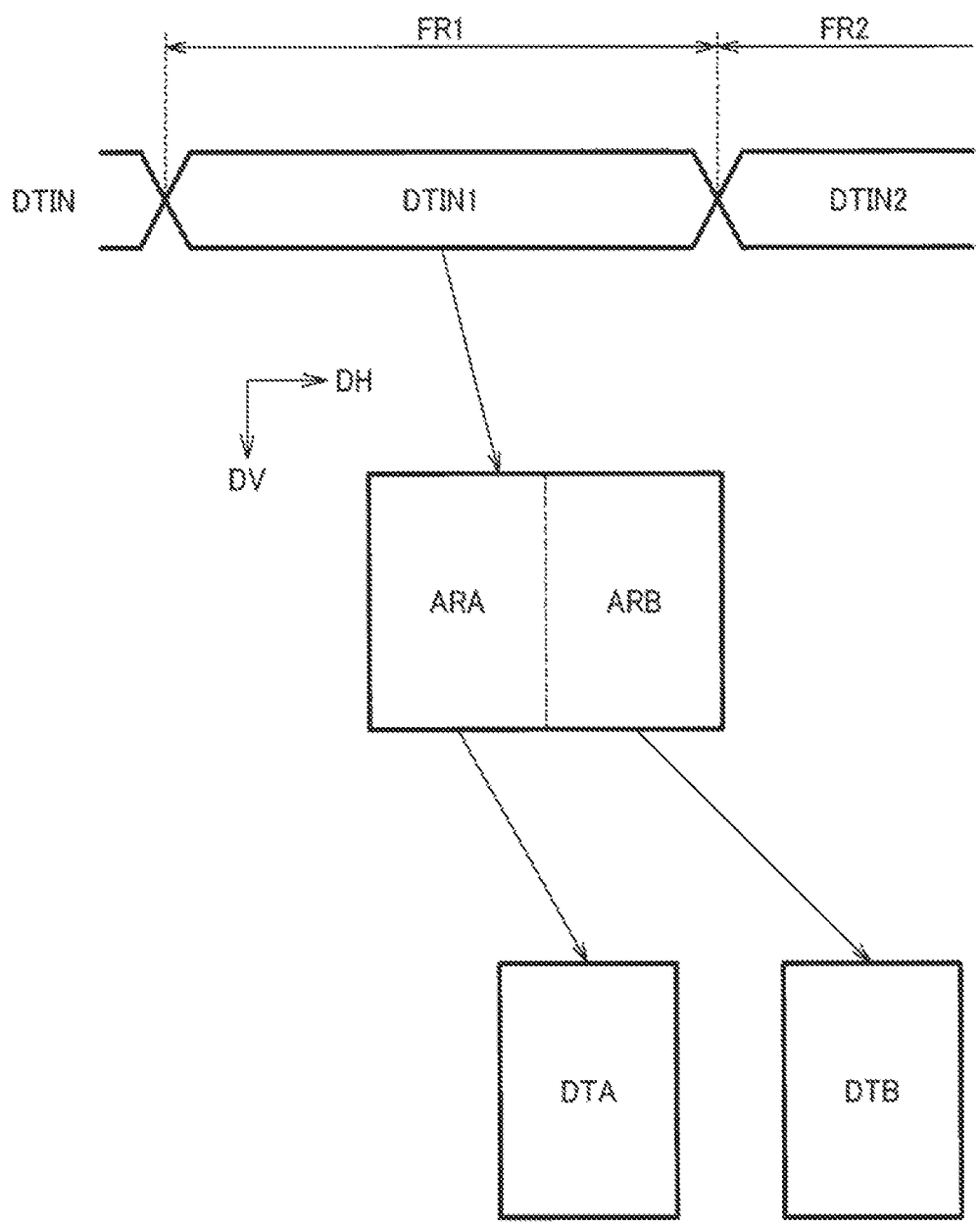
FIG. 4 is a diagram showing image splitting in single stream transport.

FIG. 4 is a diagram showing image splitting in single stream transport. The input image data DTIN includes image data DTIN1 of one image as data of the frame FR1. The image data DTIN1 is data obtained by combining the first image data DTA and the second image data DTB in the frame FR1. A horizontal scanning direction for an image is denoted by DH, and a vertical scanning direction for the image is denoted by DV. For example, one image is split into two areas ARA and ARB in the horizontal scanning direction DH, the first image data DTA is allocated to the area ARA, and the second image data DTB is allocated to the area ARB. The image splitting circuit 120 splits the input image data DTIN into data in the area ARA and data in the area ARB, outputs the data in the area ARA as the first image data DTA, and outputs the data in the area ARB as the second image data DTB. Although FIG. 4 shows an example in which an image is equally split in the horizontal scanning direction DH, a splitting direction is not limited to the horizontal scanning direction DH, and a splitting position is not limited to the center in the horizontal scanning direction DH.

The switching circuit 130 shown in FIG. 2 receives the first image data DTA and the second image data DTB and outputs first channel data DCH1 to fourth channel data DCH4. The switching circuit 130 allocates the first image data DTA to i channels among the first to fourth channels, and allocates the second image data DTB to j channels among the remaining channels. i and j are each an integer of 1 or more, n is 4 or less, and i+j=n=4. When the first image data DTA is allocated to a plurality of channels, the switching circuit 130 splits the first image data DTA and allocates the split first image data DTA to the channels. The same applies to the second image data DTB. An example of allocating data to channels will be described later.

The switching circuit 130 switches allocation of image data to channels based on allocation information stored in, for example, a storage unit (not shown) provided in the circuit device 100. The allocation information is information for instructing allocation of image data to channels. The storage unit is a register, a volatile memory, a nonvolatile memory, or the like. For example, the processing device 300 may write the allocation information to a register or a volatile memory. Alternatively, the allocation information may be written in a nonvolatile memory at the time of manufacturing the display system 400 or the like.

The first output terminal group TG1 is coupled to the first display 210 or the second display 220. Hereinafter, the first display 210 or the second display 220 is also simply referred to as a display. The first transmission circuit 141 receives the first channel data DCH1 and outputs, from the first output terminal group TG1, first channel transmission image data DTQ1 suitable for an image interface between the circuit device 100 and the display. The switching circuit 130 may output the data DCH1 suitable for the image interface, and in this case, the data DCH1 may be output as the transmission image data DTQ1. Alternatively, the first transmission circuit 141 may output the transmission image data DTQ1 by converting the data DCH1 into data in a format suitable for the image interface. The image interface between the circuit device 100 and the display may be an image interface of various standards, and may be, for example, an open LVDS display interface (open LDI), a display port, or a mobile industry processor interface display serial interface 2 (MIPI DSI-2).

Figure 5:
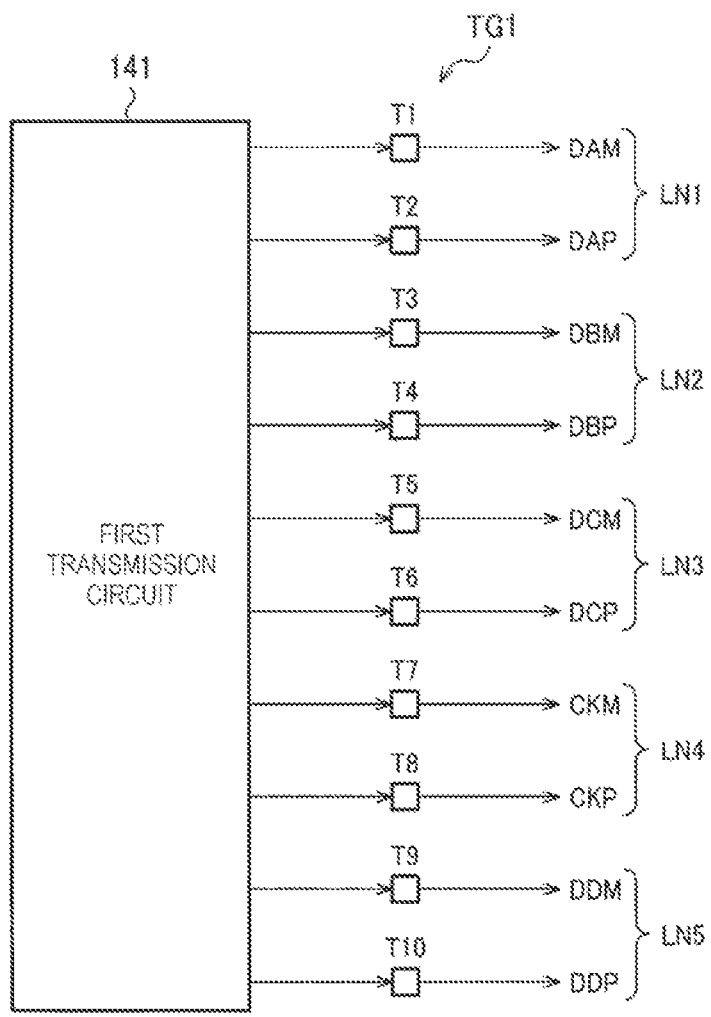
FIG. 5 shows an example of a first output terminal group.

Although the first output terminal group TG1 is denoted by one terminal symbol in FIG. 2, the first output terminal group TG1 includes a plurality of terminals as shown in FIG. 5. The first transmission circuit 141 outputs a first lane signal LN1 to a fifth lane signal LN5 as signals of the first channel transmission image data DTQ1. The first lane signal LN1 includes an inversion signal DAM and a non-inversion signal DAP which are differential data signals. The inversion signal DAM is output from a terminal T1, and the non-inversion signal DAP is output from a terminal T2. The second lane signal LN2 includes an inversion signal DBM and a non-inversion signal DBP which are differential data signals. The inversion signal DBM is output from a terminal T3, and the non-inversion signal DBP is output from a terminal T4. The third lane signal LN3 includes an inversion signal DCM and a non-inversion signal DCP which are differential data signals. The inversion signal DCM is output from a terminal T5, and the non-inversion signal DCP is output from a terminal T6. The fourth lane signal LN4 includes an inversion signal CKM and a non-inversion signal CKP which are differential clock signals. The inversion signal CKM is output from a terminal T7, and the non-inversion signal CKP is output from a terminal T8. The fifth lane signal LN5 includes an inversion signal DDM and a non-inversion signal DDP which are differential data signals. The inversion signal DDM is output from a terminal T9, and the non-inversion signal DDP is output from a terminal T10.

Although FIG. 5 shows an example in which the first output terminal group TG1 includes 10 terminals T1 to T10, the number of terminals included in the output terminal group is not limited to 10. Although FIG. 5 shows an example in which the first output terminal group TG1 includes lanes of data signals and lanes of clock signals, the first output terminal group TG1 may include only lanes of data signals. In this case, a clock signal is superimposed on a data signal and is output, and the clock signal is extracted or regenerated from the data signal in a receiving circuit of the display. A timing control signal may be superimposed on the data signal according to a standard of an image interface. The timing control signal is a horizontal synchronization signal, a vertical synchronization signal, or a data enable signal. In this case, the timing control signal is extracted or regenerated from the data signal in the receiving circuit of the display.

The second transmission circuit 142 shown in FIG. 2 receives the second channel data DCH2 and outputs, from the second output terminal group TG2, second channel transmission image data DTQ2 suitable for an image interface between the circuit device 100 and the display. The third transmission circuit 143 receives the third channel data DCH3 and outputs, from the third output terminal group TG3, third channel transmission image data DTQ3 suitable for an image interface between the circuit device 100 and the display. The fourth transmission circuit 144 receives the fourth channel data DCH4 and outputs, from the fourth output terminal group TG4, fourth channel transmission image data DTQ4 suitable for an image interface between the circuit device 100 and the display. Details of the second transmission circuit 142 to the fourth transmission circuit 144 and the second output terminal group TG2 to the fourth output terminal group TG4 are the same as the first transmission circuit 141 and the first output terminal group TG1.

Figure 6:
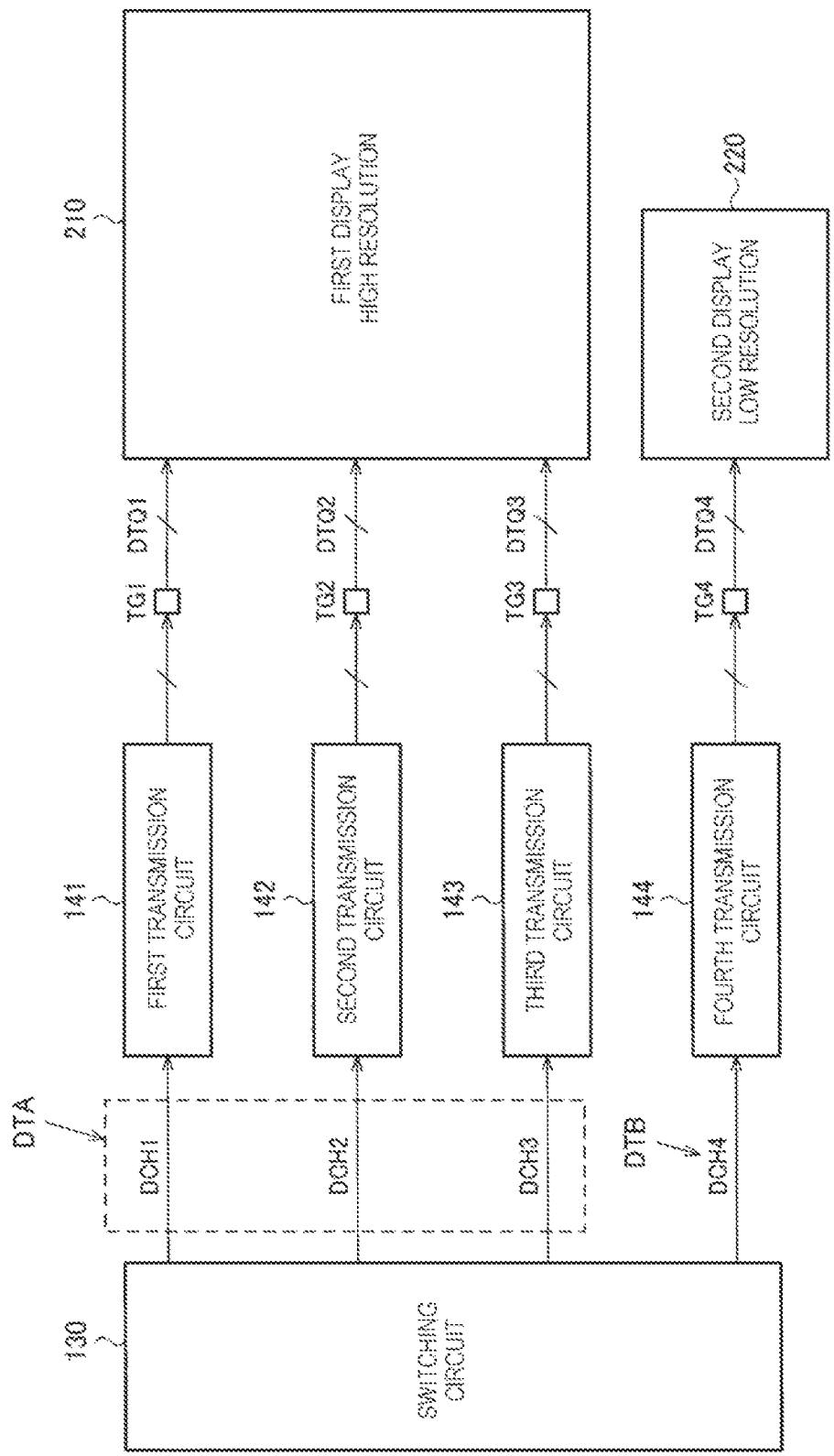
FIG. 6 shows a first coupling example between the circuit device and displays.

FIG. 6 shows a first coupling example between the circuit device and displays. The image splitting circuit 120 is not shown in FIG. 6. In this coupling example, the first display 210 has a resolution higher than that of the second display 220. When a maximum transfer rate per channel is RTmax, the first display 210 has a resolution that requires a transfer rate of, for example, about 2×RTmax to 3×RTmax, and the second display 220 has a resolution that requires a transfer rate of, for example, RTmax or less.

The first display 210 with a high resolution is coupled to the first output terminal group TG1 to the third output terminal group TG3, and the second display 220 with a low resolution is coupled to the fourth output terminal group TG4. The switching circuit 130 allocates the first image data DTA for the first display 210 to the first channel data DCH1 to the third channel data DCH3, and allocates the second image data DTB for the second display 220 to the fourth channel data DCH4.

Figure 7:
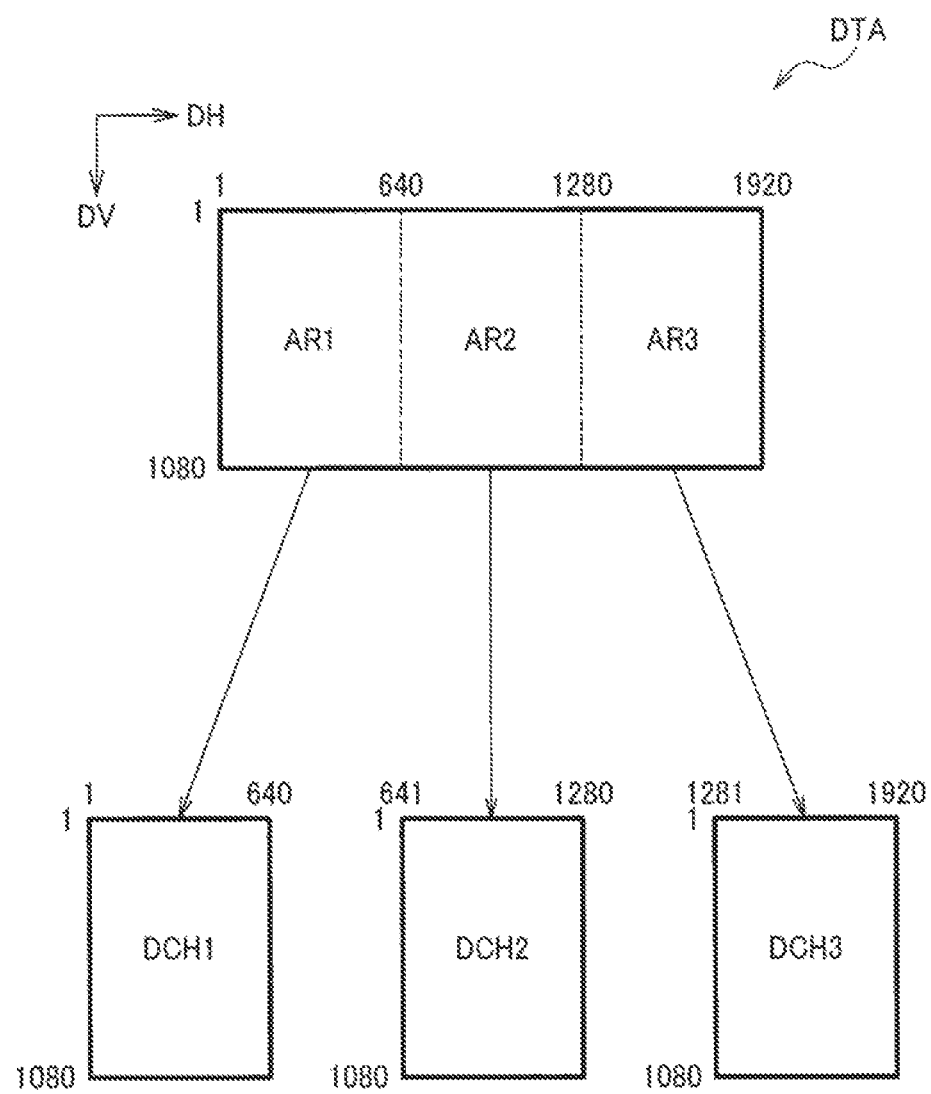
FIG. 7 is a diagram showing image splitting performed by a switching circuit.

FIG. 7 is a diagram showing image splitting performed by the switching circuit. For example, image data of one frame in the first image data DTA is 1920×1080 pixels. The switching circuit 130 splits the image data with 1920×1080 pixels into three pieces in the horizontal scanning direction DH, that is, image data in an area AR1 with first to 640th pixels, image data in an area AR2 with 641st to 1280th pixels, and image data in an area AR3 with 1281st to 1920th pixels. The switching circuit 130 outputs the image data in the area AR1 as the first channel data DCH1, outputs the image data in the area AR2 as the second channel data DCH2, and outputs the image data in the area AR3 as the third channel data DCH3.

The coupling between the circuit device 100 and the displays is not limited to the coupling shown in FIG. 6. For example, the first display 210 may have a low resolution and the second display 220 may have a high resolution. At this time, the first display 210 may be coupled to the first output terminal group TG1, and the second display 220 may be coupled to the second output terminal group TG2 to the fourth output terminal group TG4.

Figure 8:
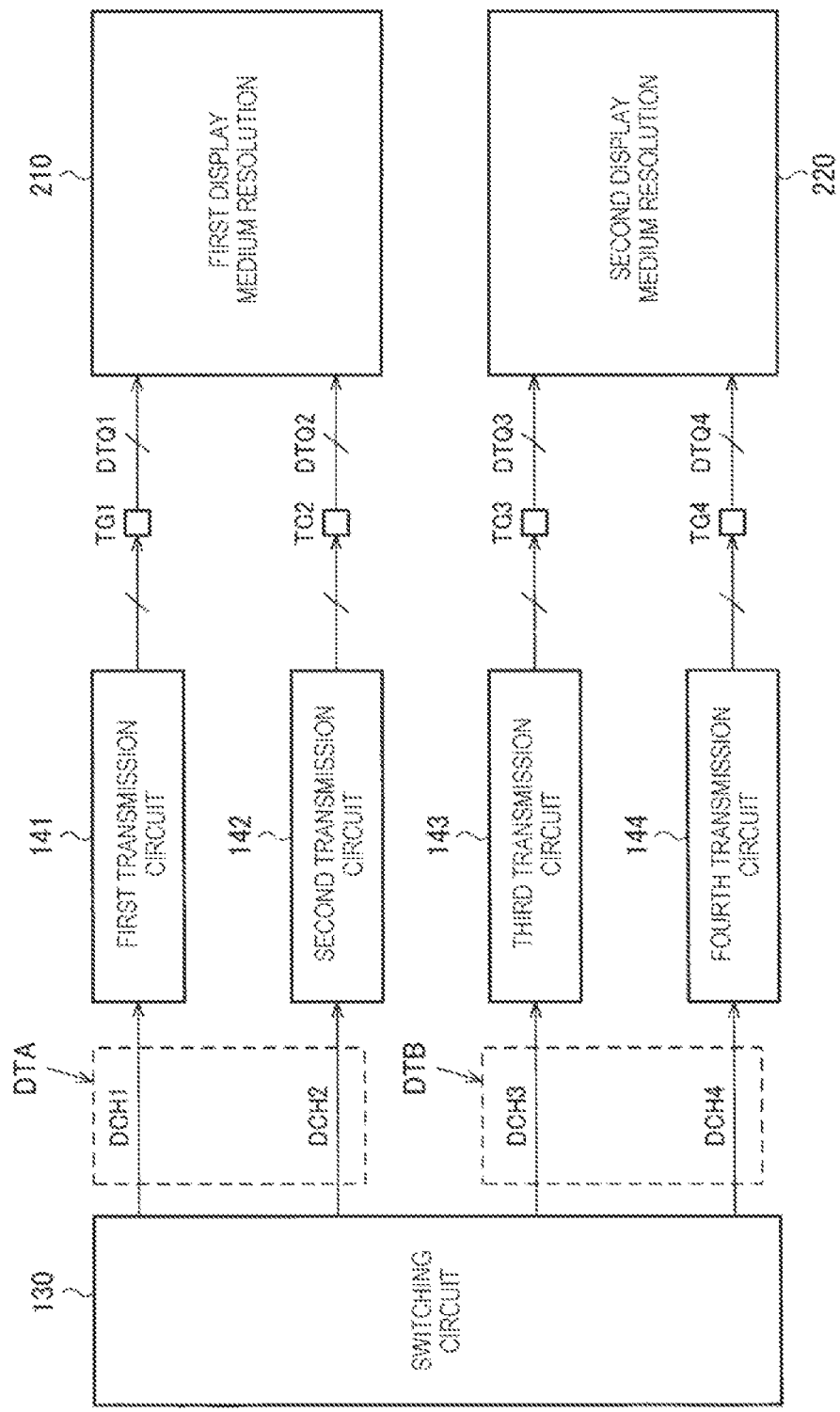
FIG. 8 shows a second coupling example between the circuit device and the displays.

FIG. 8 shows a second coupling example between the circuit device and the displays. In FIG. 8, the image splitting circuit 120 is not shown. In this coupling example, the first display 210 and the second display 220 have the same medium resolution. When a maximum transfer rate per channel is RTmax, each display has a resolution that requires a transfer rate of, for example, about RTmax to 2×RTmax.

The first display 210 with a medium resolution is coupled to the first output terminal group TG1 and the second output terminal group TG2, and the second display 220 with a medium resolution is coupled to the third output terminal group TG3 and the fourth output terminal group TG4. The switching circuit 130 allocates the first image data DTA for the first display 210 to the first channel data DCH1 and the second channel data DCH2, and allocates the second image data DTB for the second display 220 to the third channel data DCH3 and the fourth channel data DCH4. A method of splitting the image data is the same as the method shown in FIG. 7.

Figure 9:
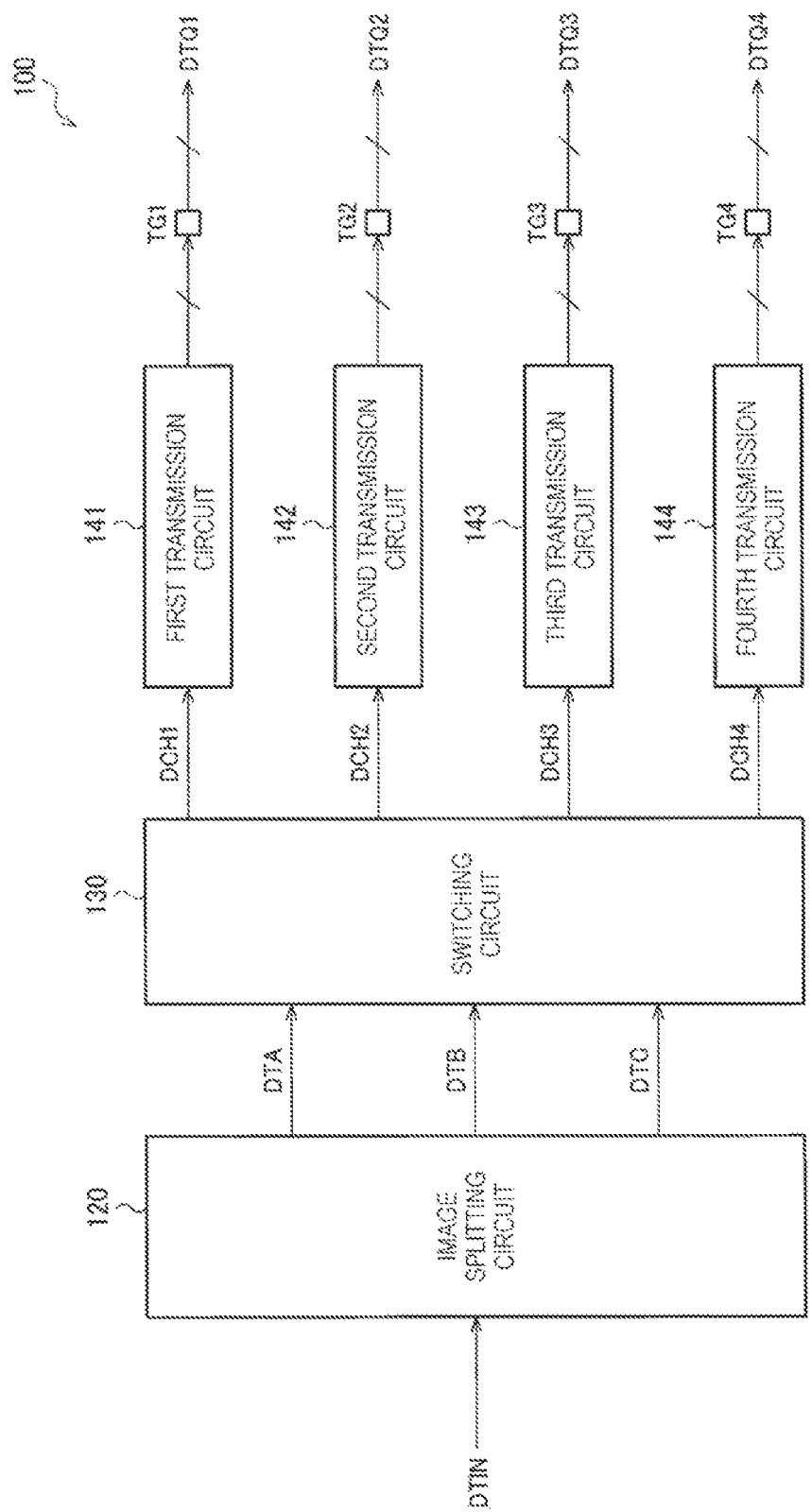
FIG. 9 shows a configuration example of the circuit device when three displays are coupled.

The number of displays coupled to the circuit device 100 is not limited to two. FIG. 9 shows configuration example of the circuit device when three displays are coupled. In this configuration example, the image splitting circuit 120 receives the input image data DTIN, and splits the received input image data DTIN into the first image data DTA for the first display, the second image data DTB for the second display, and third image data DTC for a third display.

Figure 10:
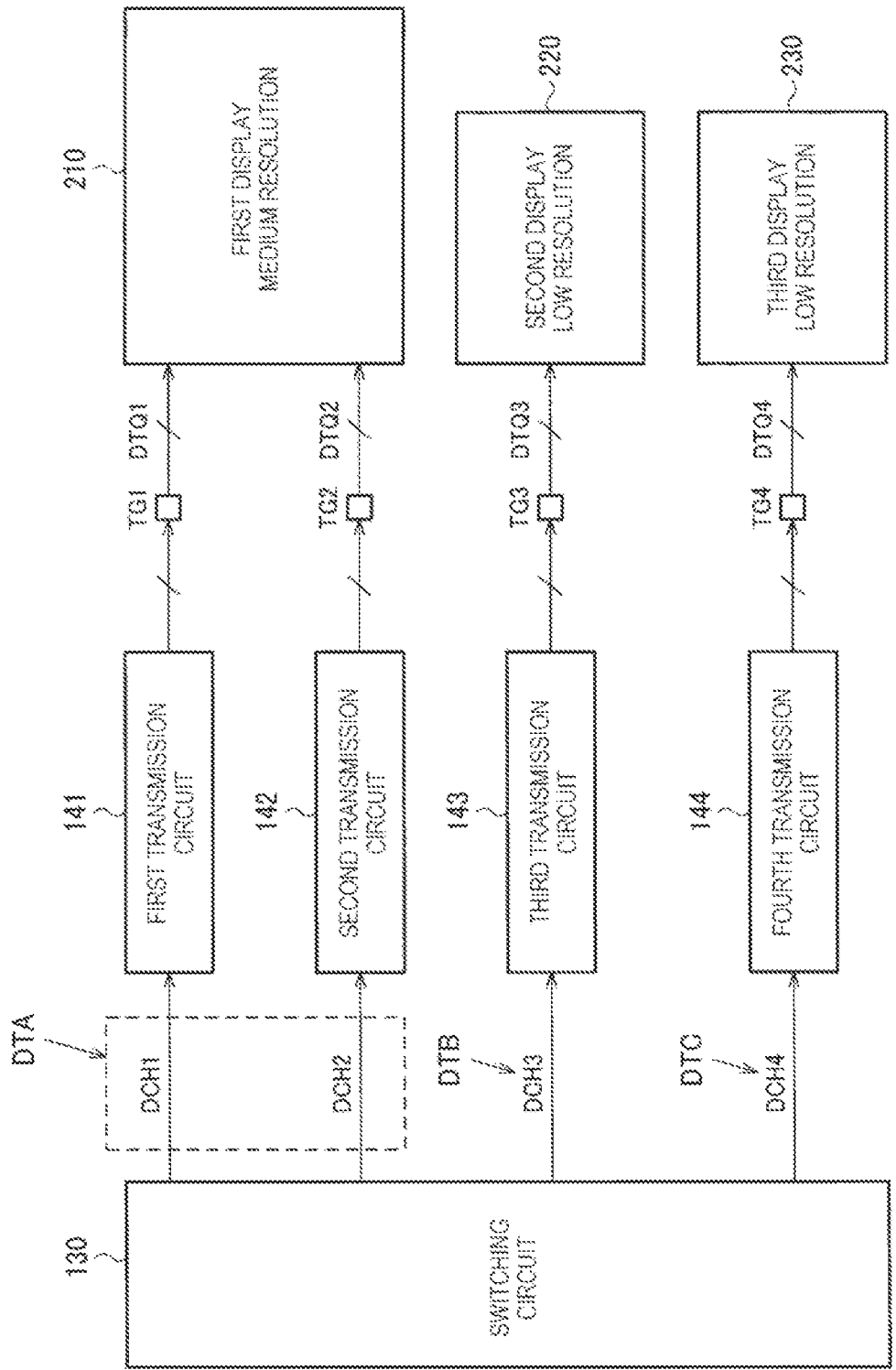
FIG. 10 shows a coupling example between the circuit device and the three displays.

FIG. 10 shows a coupling example between the circuit device and the three displays. In FIG. 10, the image splitting circuit 120 is not shown. In this coupling example, the first display 210 has a medium resolution, and the second display 220 and a third display 230 have a resolution lower than that of the first display 210.

The first display 210 with a medium resolution is coupled to the first output terminal group TG1 and the second output terminal group TG2. The second display 220 with a low resolution is coupled to the third output terminal group TG3, and the third display 230 with a low resolution is coupled to the fourth output terminal group TG4. The switching circuit 130 allocates the first image data DTA for the first display 210 to the first channel data DCH1 and the second channel data DCH2. A method of splitting the image data is the same as the method shown in FIG. 7. The switching circuit 130 allocates the second image data DTB for the second display 220 to the third channel data DCH3, and allocates the third image data DTC for the third display 230 to the fourth channel data DCH4.

The coupling between the circuit device 100 and the displays is not limited to the coupling shown in FIG. 10. For example, the first display 210 and the second display 220 may have a low resolution, and the third display 230 may have a medium resolution. In this case, the first display 210 may be coupled to the first output terminal group TG1, the second display 220 may be coupled to the second output terminal group TG2, and the third display 230 may be coupled to the third output terminal group TG3 and the fourth output terminal group TG4.

In the embodiment described above, the circuit device 100 includes the image splitting circuit 120, the first output terminal group TG1 to the n-th output terminal group TGn, and the switching circuit 130. n is an integer of 3 or more. The image splitting circuit 120 splits the input image data DTIN into the first image data DTA to be displayed on the first display 210 and the second image data DTB to be displayed on the second display 220. The switching circuit 130 allocates the first image data DTA and the second image data DTB to the first output terminal group TG1 to the n-th output terminal group TGn. The switching circuit 130 allocates the first image data DTA to any i output terminal groups among the first output terminal group TG1 to the n-th output terminal group TGn, and outputs the first image data DTA from the i output terminal groups to the first display 210. i is an integer of 1 or more and n−1 or less. The switching circuit 130 allocates the second image data DTB to any j output terminal groups among output terminal groups obtained by excluding the i output terminal groups from the first output terminal group TG1 to the n-th output terminal group TGn, and outputs the second image data DTB from the j output terminal groups to the second display 220. j is an integer of 1 or more and n−i or less.

According to the embodiment, the first output terminal group TG1 to the n-th output terminal group TGn are not dedicated to the first display 210 and the second display 220. That is, each output terminal group can be coupled to any display, and image data corresponding to such coupling can be allocated to a corresponding output terminal group. Accordingly, a required number of output terminal groups can be allocated to each display corresponding to the resolution of the first display 210 and the resolution of the second display 220 that are coupled to the circuit device 100. Such non-dedicated output terminal groups eliminate the necessary to prepare a custom circuit device. Alternatively, since the non-dedicated output terminal groups eliminate the necessary to prepare output terminals more than necessary, a chip size of the circuit device can be reduced.

In the embodiment, the circuit device 100 includes the first transmission circuit to the n-th transmission circuit. The first transmission circuit to the n-th transmission circuit output transmission image data to the first output terminal group TG1 to the n-th output terminal group TGn based on channel data from the switching circuit 130 and a clock signal. The switching circuit 130 determines allocation of channels and transmission circuits based on the above-described allocation information.

According to the embodiment, the first transmission circuit to the n-th transmission circuit can transmit the transmission image data to the first display 210 or the second display 220 via the first output terminal group TG1 to the n-th output terminal group TGn based on channel data allocated by the switching circuit 130 and a clock signal. Accordingly, each output terminal group is not a terminal dedicated to the first display 210 or the second display 220, and is a terminal to which a coupling destination can be freely allocated.

In the embodiment, each output terminal group includes a data lane, or includes a data lane and a clock lane.

An image interface that couples the circuit device 100 and the display may have various standards. For example, when an image interface standard in which a clock signal is superimposed on a data signal is adopted, each output terminal group may include a data lane. Alternatively, when an image interface standard in which a clock signal is transported separately from a data signal is adopted, each output terminal group may include a data lane and a clock lane.

In the embodiment, each of the first output terminal group TG1 to the n-th output terminal group TGn includes a plurality of differential output terminals from which differential signals are output.

In the example shown in FIG. 5, a set including the terminals T1 and T2, a set including the terminals T3 and T4, a set including the terminals T5 and T6, a set including the terminals T7 and T8, and a set including the terminals T9 and T10 constitute differential output terminals. For example, the differential signals DAM and DAP are output from the terminals T1 and T2.

According to the embodiment, the output terminal groups and the display can be coupled to each other according to an image interface standard for performing data transport by differential signals such as an open LDI.

In the embodiment, when the resolution of the first display 210 is higher than the resolution of the second display 220, i is larger than j. In the embodiment, when the resolution of the first display 210 is the same as the resolution of the second display 220, i is equal to j.

A transfer rate of image data is determined according to the resolution of the display, and the number of output terminal groups required for the transfer rate, that is, the number of required channels is determined. According to the embodiment, the number of output terminal groups corresponding to the resolution of the display can be allocated.

2. Arrangement Example of Output Terminal Groups

Figure 11:
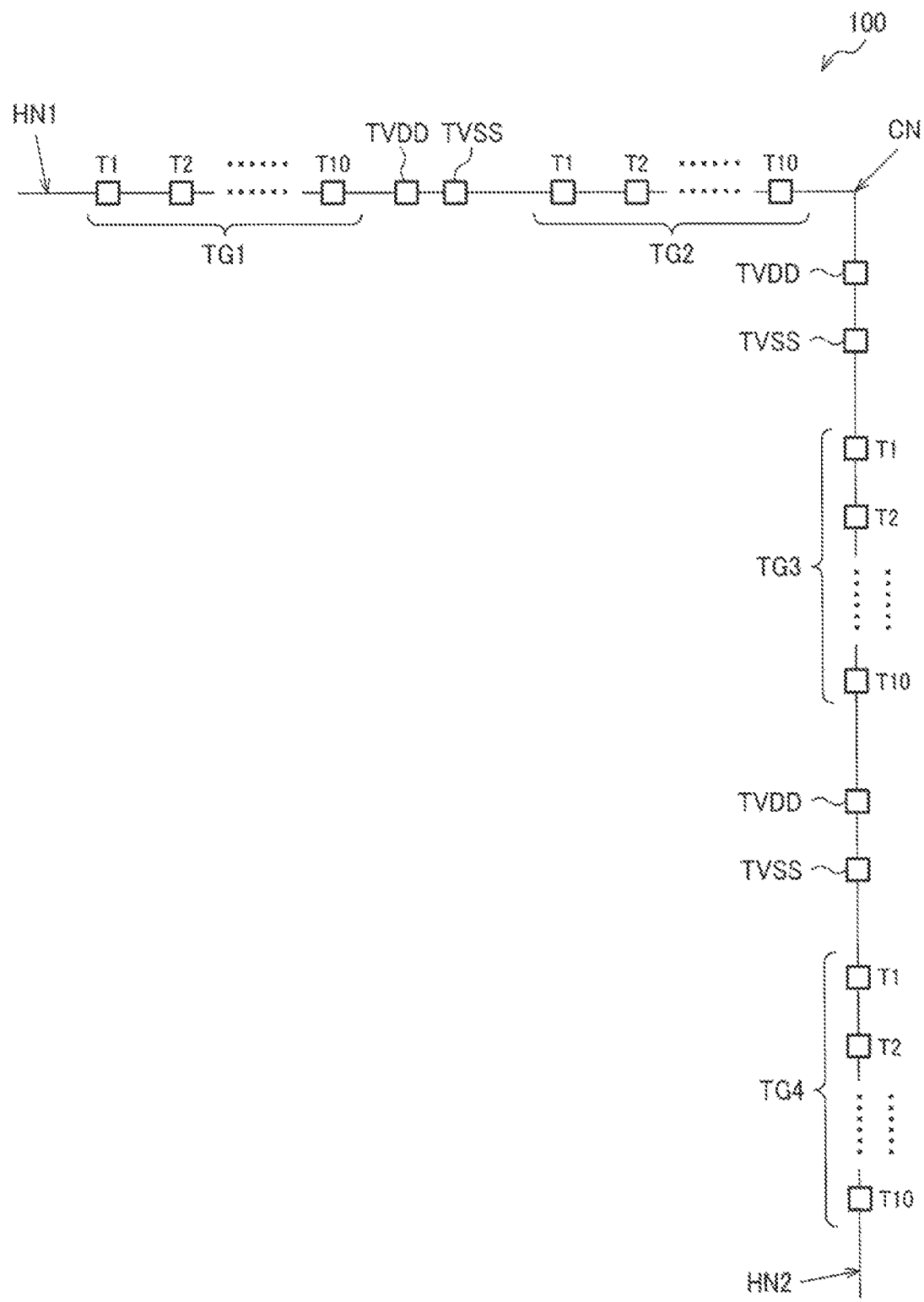
FIG. 11 shows an arrangement example of output terminal groups for the circuit device in a plan view.

FIG. 11 shows an arrangement example of output terminal groups for the circuit device in a plan view. The terminals shown in FIG. 11 are terminals for mounting the circuit device 100 on a board. For example, when a semiconductor board is accommodated in a package, the terminals shown in FIG. 11 are terminals provided in the package. Alternatively, when the semiconductor board is accommodated in a package or when the semiconductor board is mounted on a board as a bare chip, the terminals shown in FIG. 11 may be a pad provided on the semiconductor board. A relationship between the terminals and sides shown in FIG. 11 is merely an example. For example, when the terminals are a pad, the pad is arranged at inner sides with respect to sides of the semiconductor board. Alternatively, when the terminals are terminals of a package, the terminals may be, for example, lead terminals protruding from sides of the package, or bump terminals arranged inner sides with respect to sides of the package.

A power supply terminal TVDD or a ground terminal TVSS is provided between an m-th output terminal group TGm and an (m+1)-th output terminal group TG (m+1) among the first output terminal group TG1 to the n-th output terminal group TGn. m is an integer of 1 or more and n−1 or less.

According to the embodiment, each output terminal group corresponds to an image data transport channel. The power supply terminal TVDD or the ground terminal TVSS is provided between two adjacent channels.

The power supply terminal TVDD is a terminal for inputting a power supply voltage to the circuit device 100. The ground terminal TVSS is a terminal for inputting a ground voltage to the circuit device 100. FIG. 11 shows an example in which the power supply terminal TVDD and the ground terminal TVSS are provided between the first output terminal group TG1 and the second output terminal group TG2, between the second output terminal group TG2 and the third output terminal group TG3, and between the third output terminal group TG3 and the fourth output terminal group TG4. However, only one of the power supply terminal TVDD and the ground terminal TVSS may be provided between two adjacent output terminal groups.

The m-th output terminal group TGm among the first output terminal group TG1 to the n-th output terminal group TGn is arranged on a first side HN1 of the circuit device 100. The (m+1)-th output terminal group TG (m+1) among the first output terminal group TG1 to the n-th output terminal group TGn is arranged on a second side HN2 of the circuit device 100. The second side HN2 intersects the first side HN1 at a corner portion CN of the circuit device 100.

According to the embodiment, a plurality of terminals T1 to T10 included in one output terminal group are arranged on the same side and are arranged in a manner of not going across the corner portion CN. With such an arrangement, it is possible to avoid interference between an arrangement position of a drive circuit of the second output terminal group TG2 and an arrangement position of a drive circuit of the third output terminal group TG3 in an integrated circuit device.

FIG. 11 shows an example in which the first output terminal group TG1 and the second output terminal group TG2 are arranged on the first side HN1, and the third output terminal group TG3 and the fourth output terminal group TG4 are arranged on the second side HN2. However, the corner portion CN is not limited to being located between the second output terminal group TG2 and the third output terminal group TG3, and may be located between two adjacent output terminal groups.

The first output terminal group TG1 to the n-th output terminal group TGn are arranged in the order of the first output terminal group TG1 to the n-th output terminal group TGn. The switching circuit 130 allocates the first image data DTA to i output terminal groups arranged continuously side by side among the first output terminal group TG1 to the n-th output terminal group TGn. The switching circuit 130 allocates the second image data DTB to j output terminal groups continuously arranged side by side among the first output terminal group TG1 to the n-th output terminal group TGn.

According to the embodiment, the i output terminal groups coupled to the first display 210 are continuously arranged side by side, and the j output terminal groups coupled to the second display 220 are continuously arranged side by side. When signal lines intersect one another using a multilayer board or the like, quality of a signal may deteriorate, but according to the embodiment, signal lines coupled to displays can be wired without intersecting one another on a board.

3. Non-Inversion and Inversion Switching of Signal Arrangement Order

The circuit device 100 can switch an arrangement order of signals output from an output terminal group to non-inversion or inversion. Hereinafter, a switching method will be described.

FIG. 12 is a first arrangement example of the circuit device and a connector on a board. The circuit device 100 and a connector 500 are mounted on a board 600 such as a printed board. The connector 500 is coupled to the display by a cable or the like. The connector is provided for each display, and an arrangement may be different for each connector. Here, one connector is taken as an example.

In an arrangement A, the circuit device 100 and the connector 500 are mounted on a surface SF1 of the board 600. In an arrangement B, the circuit device 100 and the connector 500 are mounted on a surface SF2 of the board 600. That is, the circuit device 100 and the connector 500 are arranged on the same surface in the arrangements A and B.

A direction in a plan view facing the surface on which the circuit device 100 and the connector 500 are arranged is referred to as LS.

Figure 13:
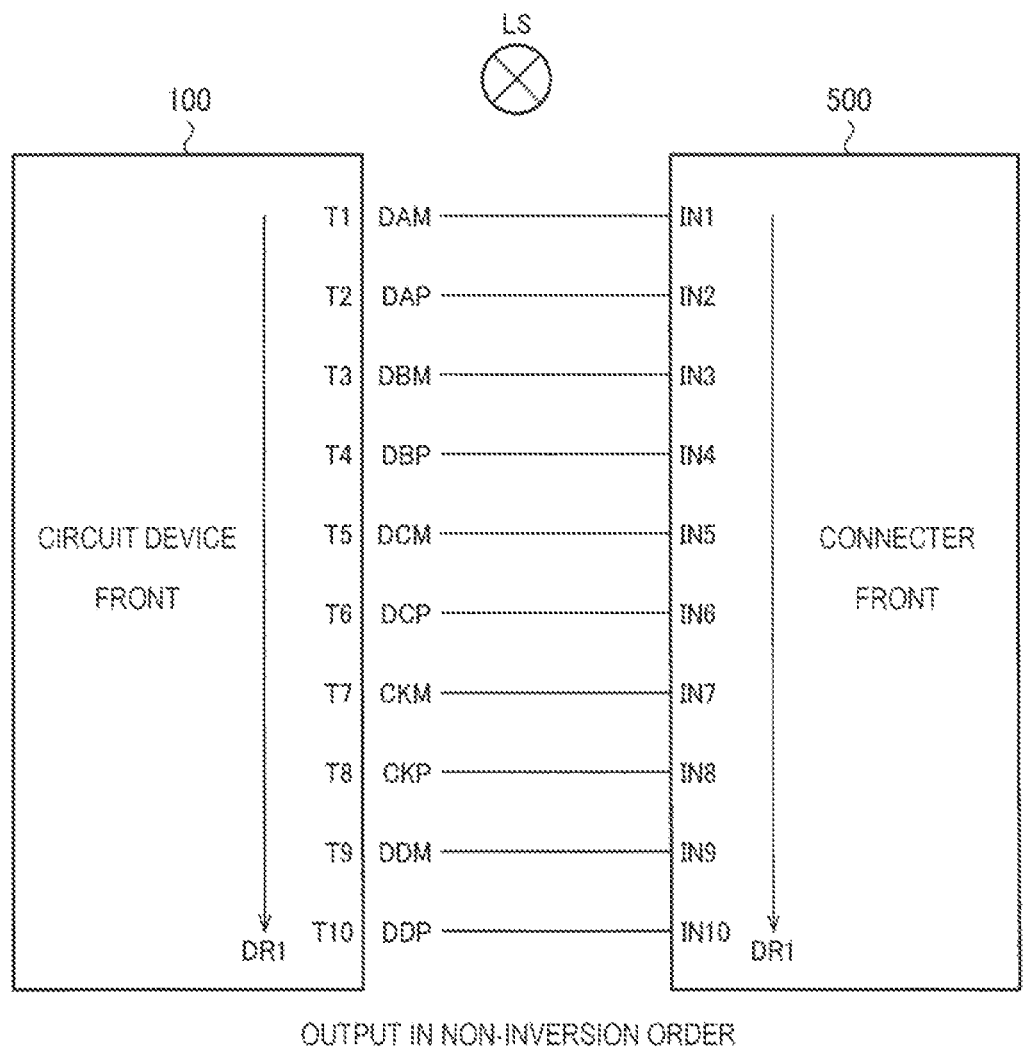
FIG. 13 shows an example of a signal arrangement order in the first arrangement example.

FIG. 13 shows an example of a signal arrangement order in the first arrangement example. FIG. 13 shows the circuit device 100 and the connector 500 when viewed in the direction LS in a plan view. Here, although an example is shown in which a side on which terminals of the circuit device 100 are arranged and a side on which terminals of the connector 500 are arranged face each other in parallel, the sides may not necessarily face each other in parallel.

The terminals T1 to T10 of the circuit device 100 are arranged in this order along a first direction DR1. In the first arrangement example, front sides of the circuit device 100 and the connector 500 are visible when viewed in the direction LS in a plan view. At this time, terminals IN1 to IN10 of the connector 500 are arranged in this order along the first direction DR1. The terminal IN1 of the connector 500 is coupled to the terminal T1 of the circuit device 100. Similarly, the terminals IN2 to IN10 of the connector 500 are coupled to the terminals T2 to T10 of the circuit device 100. The circuit device 100 outputs the first lane signal LN1 to the fifth lane signal LN5 shown in FIG. 5 in a manner of not inverting the arrangement order thereof. That is, the circuit device 100 outputs the signal DAM from the terminal T1. Similarly, the circuit device 100 outputs the signals DAP, DBM, DBP, DCM, DCP, CKM, CKP, DDM, and DDP from the terminals T2, T3, T4, T5, T6, T7, T8, T9, and T10.

FIG. 14 shows a second arrangement example of the circuit device and the connector on the board. In an arrangement C, the circuit device 100 is mounted on the surface SF1 of the board 600, and the connector 500 is mounted on the surface SF2 of the board 600. In an arrangement D, the circuit device 100 is mounted on the surface SF2 of the board 600, and the connector 500 is mounted on the surface SF1 of the board 600. That is, a surface on which the connector 500 is arranged is a back surface of a surface on which the circuit device 100 is arranged in the arrangements C and D. A direction in a plan view facing the surface on which the circuit device 100 is arranged is referred to as LS.

Figure 15:
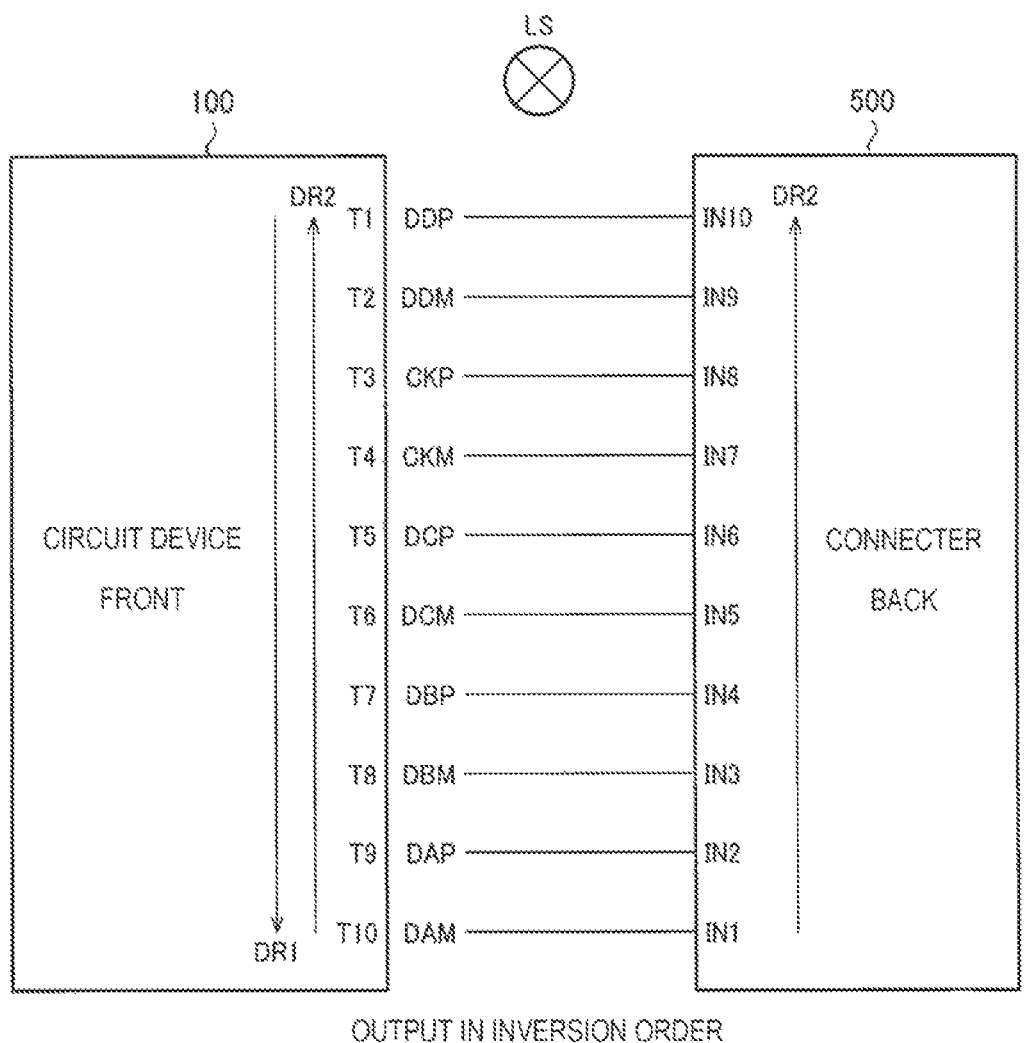
FIG. 15 shows an example of a signal arrangement order in the second arrangement example.

FIG. 15 shows an example of a signal arrangement order in the second arrangement example. FIG. 15 shows the circuit device 100 and the connector 500 when viewed in the direction LS in a plan view. Here, although an example is shown in which a side on which terminals of the circuit device 100 are arranged and a side on which terminals of the connector 500 are arranged face each other in parallel, the sides may not necessarily face each other in parallel.

The terminals T1 to T10 of the circuit device 100 are arranged in this order along the first direction DR1. In the second arrangement example, a front side of the circuit device 100 and a back side of the connector 500 are visible when viewed in the direction LS in a plan view. At this time, the terminals IN1 to IN10 of the connector 500 are arranged in this order in a second direction DR2 opposite to the first direction DR1. The terminal IN1 of the connector 500 is coupled to the terminal T10 of the circuit device 100. Similarly, the terminals IN2 to IN10 of the connector 500 are coupled to the terminals T9 to T1 of the circuit device 100. The circuit device 100 outputs the first lane signal LN1 to the fifth lane signal LN5 shown in FIG. 5 and differential signals of respective lanes and the signals in a manner of inverting the arrangement orders thereof. That is, the circuit device 100 outputs the signal DDP from the terminal T1. Similarly, the circuit device 100 outputs the signals DDM, CKP, CKM, DCP, DCM, DBP, DBM, DAP, and DAM from the terminals T2, T3, T4, T5, T6, T7, T8, T9, and T10.

The circuit device 100 can independently switch a signal arrangement order between inversion and non-inversion for each display. Here, a case where the first display 210 has a high resolution and the second display 220 has a low resolution will be described as an example.

Figure 16:
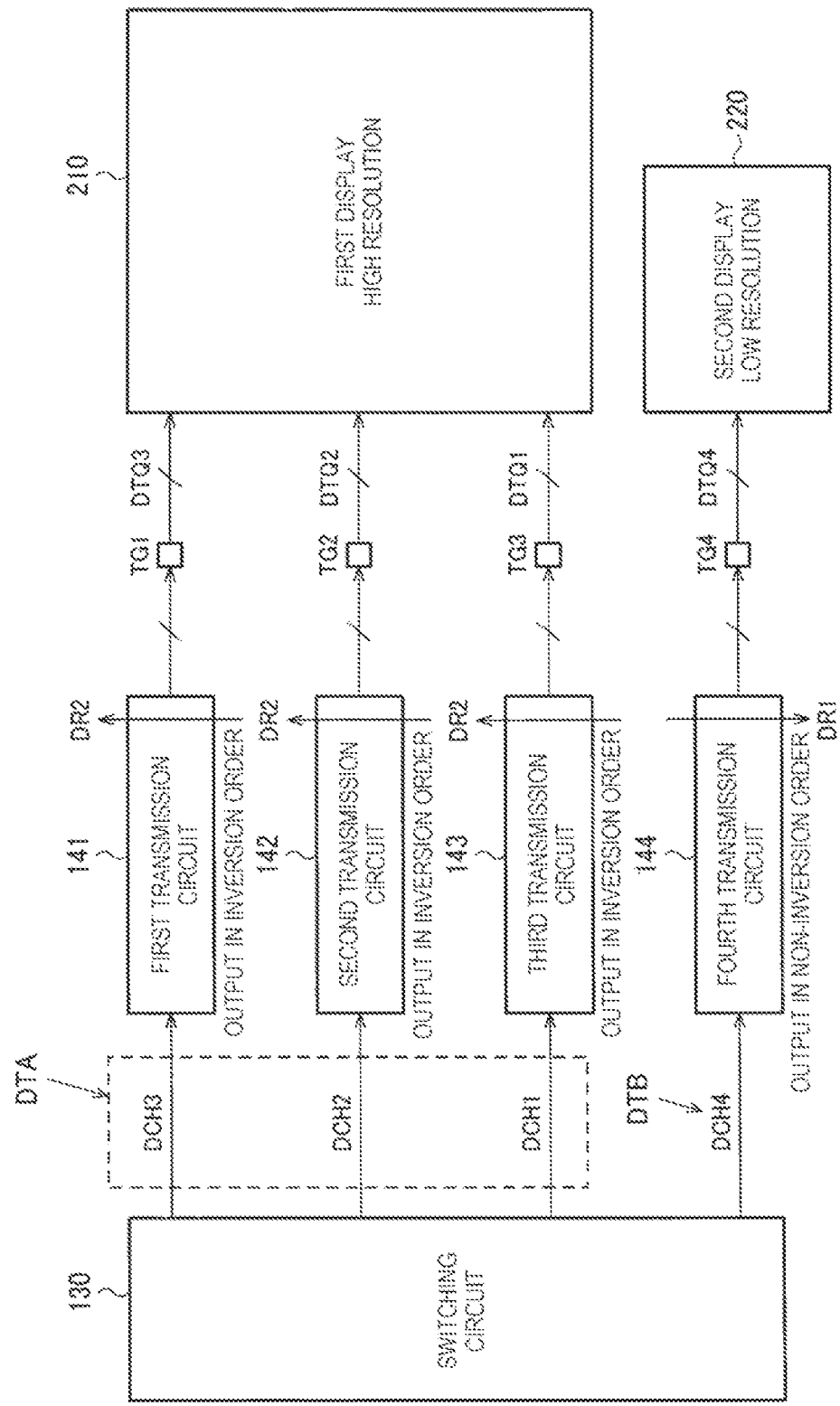
FIG. 16 shows an example in which a signal arrangement order is inverted for a first display.

FIG. 16 shows an example in which a signal arrangement order is inverted for the first display. The switching circuit 130 inverts an arrangement order of channels. That is, the switching circuit 130 outputs the first channel data DCH1 of the first image data DTA to the third transmission circuit 143, outputs the second channel data DCH2 of the first image data DTA to the second transmission circuit 142, and outputs the third channel data DCH3 of the first image data DTA to the first transmission circuit 141. That is, the third channel transmission image data DTQ3 is output from the first output terminal group TG1, the second channel transmission image data DTQ2 is output from the second output terminal group TG2, and the first channel transmission image data DTQ1 is output from the third output terminal group TG3. In these output terminal groups, arrangement orders of lanes and differential signals are inverted as shown in FIG. 15. In FIG. 16, the inversion is indicated by the "direction DR2". In the fourth output terminal group TG4 coupled to the second display 220, arrangement orders of lanes and differential signals are not inverted. In FIG. 16, the non-inversion is indicated by the "direction DR1".

Figure 17:
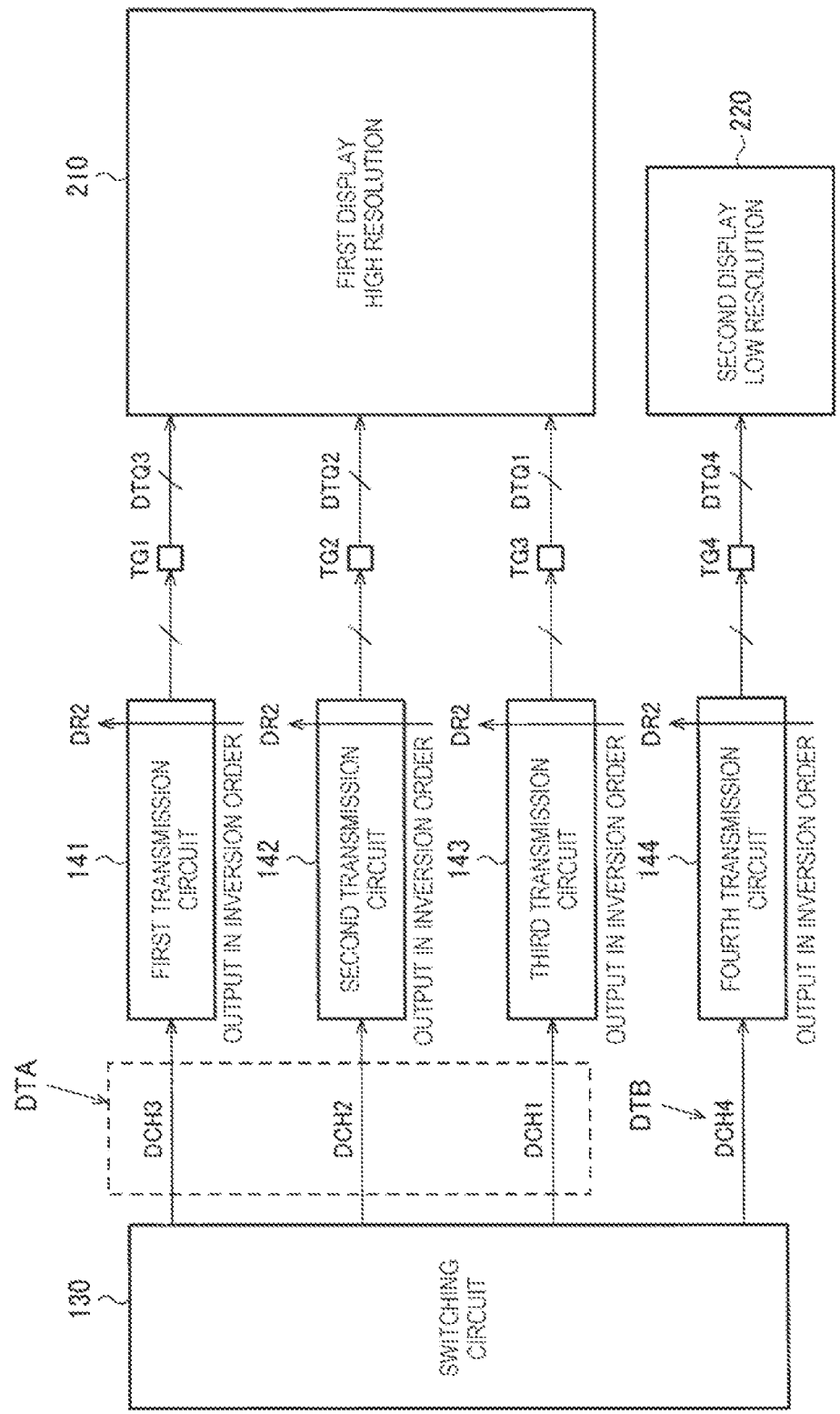
FIG. 17 shows an example in which a signal arrangement order is inverted for the first display and a second display.

FIG. 17 shows an example in which a signal arrangement order is inverted for the first display and the second display. Contents related to the first display 210 are the same as those shown in FIG. 16. In the fourth output terminal group TG4 coupled to the second display 220, arrangement orders of lanes and differential signals are inverted. In FIG. 17, the inversion is indicated by the "direction DR2". When a plurality of output terminal groups are coupled to the second display 220, the switching circuit 130 inverts an arrangement order of channels of the second image data DTB.

A mode in which a signal arrangement order is not inverted for the first display 210 is referred to as a first mode, and a mode in which a signal arrangement order is inverted for the first display 210 is referred to as a second mode. A mode in which a signal arrangement order is not inverted for the second display 220 is referred to as a third mode, and a mode in which a signal arrangement order is inverted for the second display 220 is referred to as a fourth mode. The first mode and the third mode can be combined, the second mode and the third mode can be combined, the first mode and the fourth mode can be combined, or the second mode and the fourth mode can be combined.

In the embodiment described above, the switching circuit 130 splits the first image data DTA into the first channel data DCH1 to i-th channel data DCHi. In the first mode, the switching circuit 130 allocates the first channel data DCH1 to the i-th channel data DCHi of the first image data DTA to a first output terminal group to an i-th output terminal group among i output terminal groups. In the second mode, the switching circuit 130 allocates the i-th channel data DCHi to the first channel data DCH1 of the first image data DTA to the first output terminal group to the i-th output terminal group among the i output terminal groups.

For example, an example of the first mode is shown in FIG. 6, and an example of the second mode is shown in FIG. 16. In FIGS. 6 and 16, i=3, and the first output terminal group to the i-th output terminal group are TG1 to TG3. In FIG. 6, the first channel data DCH1 to the third channel data DCH3 of the first image data DTA are allocated to TG1 to TG3. In FIG. 16, the third channel data DCH3 to the first channel data DCH1 of the first image data DTA are allocated to TG1 to TG3.

An arrangement order of signals is changed according to the design of a board as described with reference to FIGS. 12 and 14, and an arrangement order of channels is changed according to the design of a board in a similar manner. According to the embodiment, an arrangement order of channels for the first display 210 can be switched according to the design of a board on which the display system 400 is mounted. When signal lines intersect one another using a multilayer board or the like, quality of a signal may deteriorate, but according to the embodiment, signal lines coupled to displays can be wired without intersecting one another on a board.

In the embodiment, in each of the i output terminal groups, an arrangement order of lane signals in the second mode is an arrangement order obtained by inverting an arrangement order of lane signals in the first mode.

For example, the first lane signal LN1 to the fifth lane signal LN5 are shown in FIG. 5. As shown in FIG. 13, lane signals are arranged in the order of the first lane signal LN1 to the fifth lane signal LN5 for the terminals T1 to T10 of an output terminal group in the first mode. As shown in FIG. 15, lane signals are arranged in the order of the fifth lane signal LN5 to the first lane signal LN1 for the terminals T1 to T10 of an output terminal group in the second mode.

According to the embodiment, an arrangement order of lane signals output from an output terminal group can be switched according to the design of a board on which the display system 400 is mounted. When signal lines intersect one another using a multilayer board or the like, quality of a signal may deteriorate, but according to the embodiment, signal lines coupled to displays can be wired without intersecting one another on a board.

In the embodiment, each of the i output terminal groups includes a plurality of differential output terminals. A differential lane signal is output from each differential output terminal. An arrangement order of a non-inversion signal and an inversion signal of a differential lane signal in the second mode is an arrangement order obtained by inverting an arrangement order of a non-inversion signal and an inversion signal of a differential lane signal in the first mode.

For example, in FIG. 5, the first lane signal LN1 is a differential signal including the inversion signal DAM and the non-inversion signal DAP. As shown in FIG. 13, the first lane signal LN1 is arranged in the order of the inversion signal DAM and the non-inversion signal DAP along the first direction DR1 in the first mode. As shown in FIG. 15, the first lane signal LN1 is arranged in the order of the non-inversion signal DAP and the inversion signal DAM along the first direction DR1 in the second mode.

According to the embodiment, an arrangement order of a non-inversion signal and an inversion signal of a differential signal output from an output terminal group can be switched according to the design of a board on which the display system 400 is mounted. When signal lines intersect one another using a multilayer board or the like, quality of a signal may deteriorate, but according to the embodiment, signal lines coupled to displays can be wired without intersecting one another on a board.

In the embodiment, the switching circuit 130 splits the second image data DTB into (i+1)-th channel data DCH (i+1) to (i+j)-th channel data DCH (i+j). In the third mode combined with the first mode or the second mode, the switching circuit 130 allocates the (i+1)-th channel data DCH (i+1) to the (i+j)-th channel data DCH (i+j) of the second image data DTB to the first output terminal group to the j-th output terminal group among the j output terminal groups. In the fourth mode combined with the first mode or the second mode, the switching circuit 130 allocates the (i+j)-th channel data DCH (i+j) to the (i+1)-th channel data DCH (i+1) of the second image data DTB to the first output terminal group to the j-th output terminal group among the j output terminal groups.

For example, an example of the third mode is shown in FIG. 8. In FIG. 8, i=2 and j=2. The first output terminal group to the j-th output terminal group among the j output terminal groups are TG3 and TG4. In FIG. 8, the third channel data DCH3 and the fourth channel data DCH4 of the second image data DTB are allocated to TG3 and TG4. When a mode in the example shown in FIG. 8 is switched to the fourth mode, the fourth channel data DCH4 and the third channel data DCH3 of the second image data DTB are allocated to TG3 and TG4.

An arrangement order of signals is changed according to the design of a board as described with reference to FIGS. 12 and 14, and an arrangement order of channels is changed according to the design of a board in a similar manner. According to the embodiment, an arrangement order of channels for the second display 220 can be switched according to the design of a board on which the display system 400 is mounted. When signal lines intersect one another using a multilayer board or the like, quality of a signal may deteriorate, but according to the embodiment, signal lines coupled to displays can be wired without intersecting one another on a board.

4. Detailed Configuration Example of Circuit Device

Figure 18:
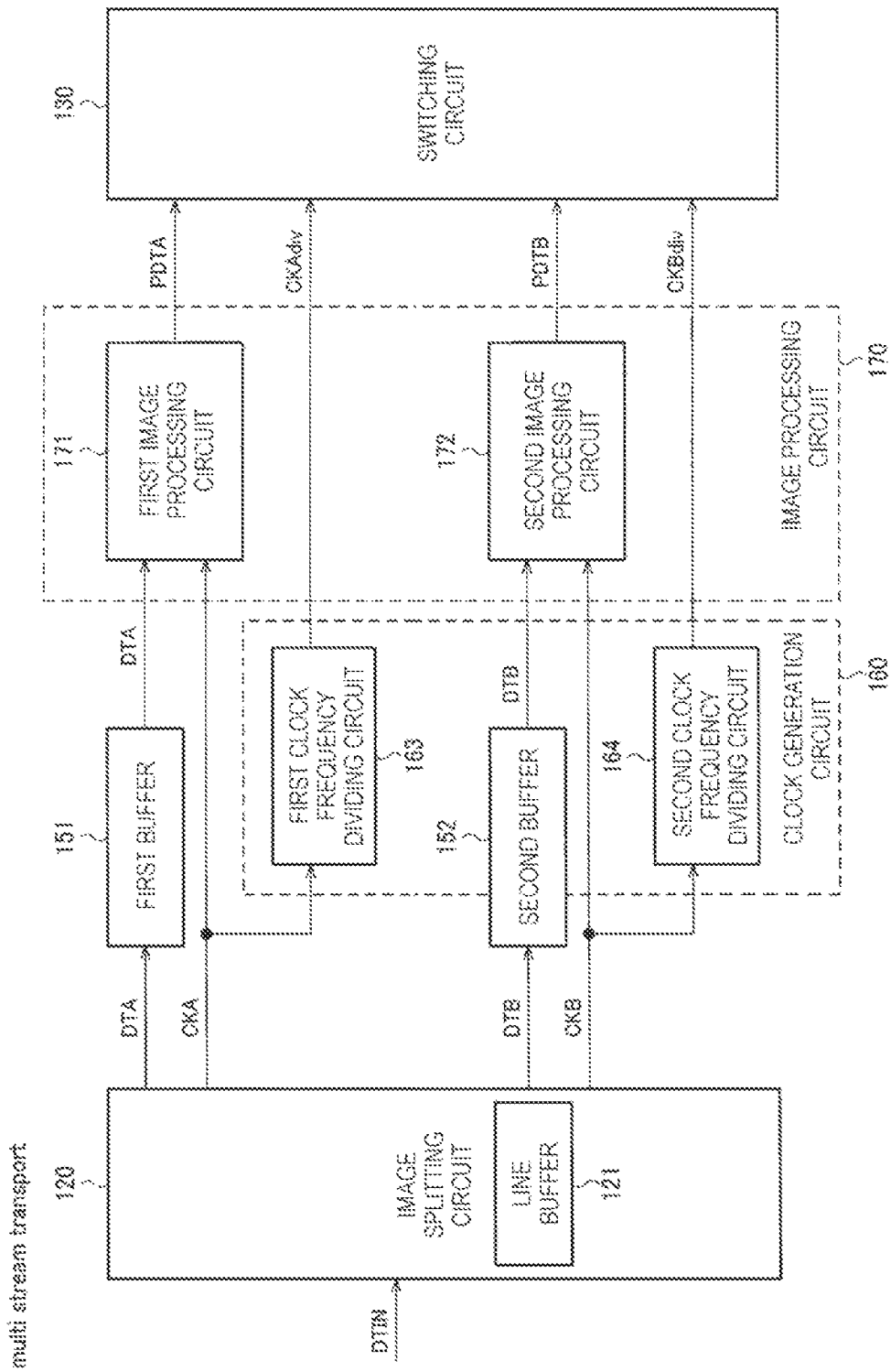
FIG. 18 shows a detailed configuration example of the circuit device in multi stream transport.

FIG. 18 shows a detailed configuration example of the circuit device in multi stream transport. The circuit device 100 further includes a first buffer 151, a second buffer 152, a clock generation circuit 160, and an image processing circuit 170. In FIG. 18, the first transmission circuit 141 to the fourth transmission circuit 144 and the first output terminal group TG1 to the fourth output terminal group TG4 are not shown.

The image splitting circuit 120 includes a line buffer 121 that buffers the first image data DTA and the second image data DTB included in the input image data DTIN. The image splitting circuit 120 outputs the first image data DTA and the second image data DTB buffered by the line buffer 121. The image splitting circuit 120 outputs a clock signal CKA synchronized with the first image data DTA based on a pixel clock defined in a packet of the first image data DTA included in the input image data DTIN. The image splitting circuit 120 outputs a clock signal CKB synchronized with the second image data DTB based on a pixel clock defined in a packet of the second image data DTB included in the input image data DTIN.

The image processing circuit 170 includes a first image processing circuit 171 and a second image processing circuit 172. Alternatively, the image processing circuit 170 may only include one of the first image processing circuit 171 and the second image processing circuit 172.

The first buffer 151 buffers the first image data DTA output from the image splitting circuit 120 and outputs the buffered first image data DTA to the first image processing circuit 171. The first buffer 151 is, for example, a first-in first-out (FIFO) memory. The first image processing circuit 171 executes image processing on the first image data DTA based on the first image data DTA from the first buffer 151 and the clock signal CKA from the image splitting circuit 120, and outputs first image data PDTA after the image processing to the switching circuit 130.

The second buffer 152 buffers the second image data DTB output from the image splitting circuit 120 and outputs the buffered second image data DTB to the second image processing circuit 172. The second buffer 152 is, for example, a first-in first-out (FIFO) memory. The second image processing circuit 172 executes image processing on the second image data DTB based on the second image data DTB from the second buffer 152 and the clock signal CKB from the image splitting circuit 120, and outputs second image data PDTB after the image processing to the switching circuit 130.

Examples of the image processing include a gradation correction, scaling, and a color correction. Alternatively, the image processing may be a distortion correction for correcting image distortion caused by an optical system in a head up display or the like.

The clock generation circuit 160 includes a first clock frequency dividing circuit 163 and a second clock frequency dividing circuit 164.

The first clock frequency dividing circuit 163 divides a frequency of the clock signal CKA and outputs a clock signal CKAdiv after the frequency division to the switching circuit 130. When the switching circuit 130 splits the first image data PDTA into data with i channels, a frequency division ratio of the clock signal CKAdiv is i. That is, a frequency of the clock signal CKAdiv is 1/i of the frequency of the clock signal CKA.

The second clock frequency dividing circuit 164 divides a frequency of the clock signal CKB and outputs a clock signal CKBdiv after the frequency division to the switching circuit 130. When the switching circuit 130 splits the second image data PDTB into data with j channels, a frequency division ratio of the clock signal CKBdiv is j. That is, a frequency of the clock signal CKBdiv is 1/j of the frequency of the clock signal CKB.

The switching circuit 130 splits the first image data PDTA into data with i channels based on the first image data PDTA and the clock signal CKAdiv after the frequency division. The switching circuit 130 splits the second image data PDTB into data with j channels based on the second image data PDTB and the clock signal CKBdiv after the frequency division.

Figure 19:
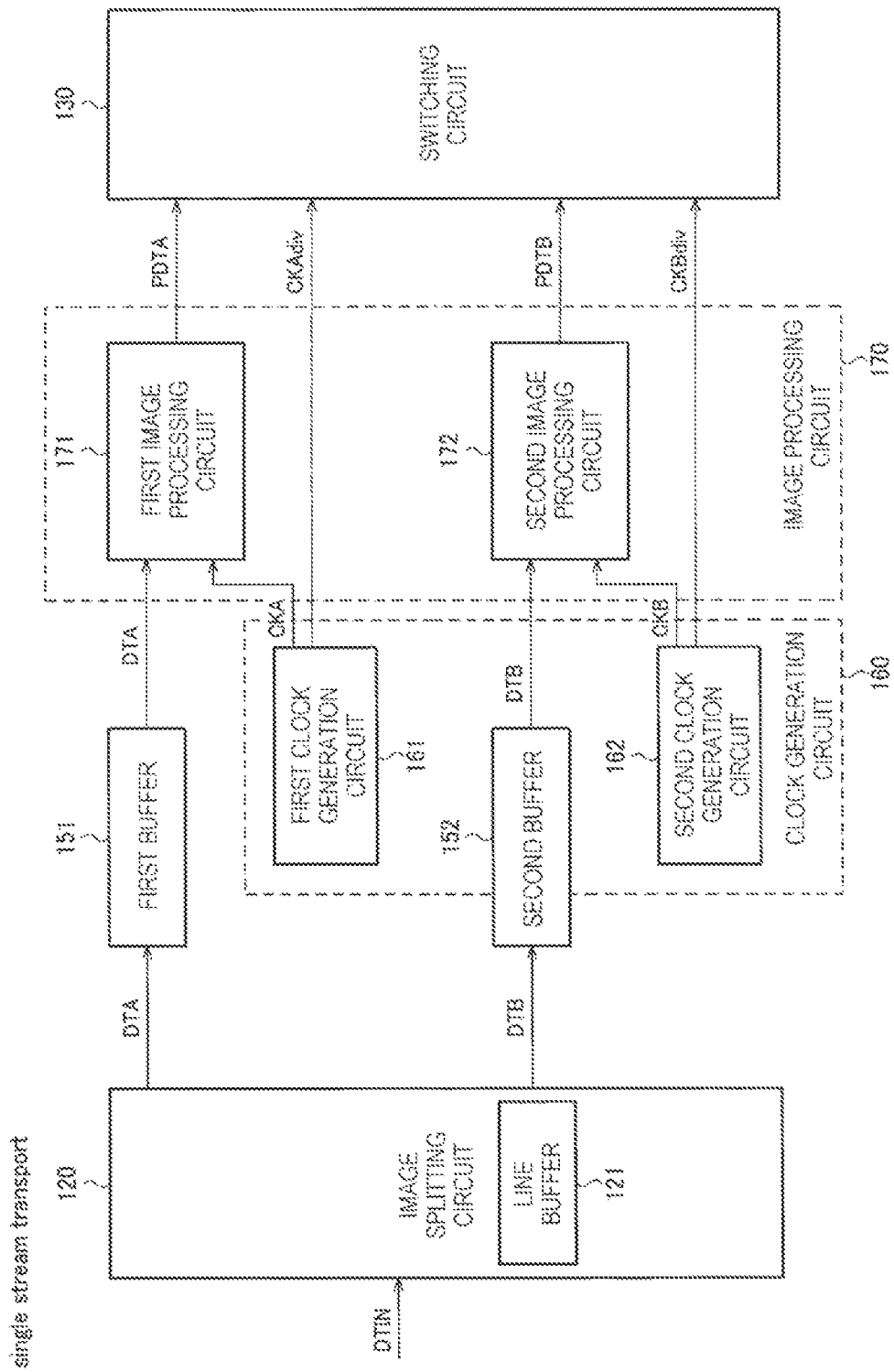
FIG. 19 shows a detailed configuration example of the circuit device in single stream transport.

FIG. 19 shows a detailed configuration example of the circuit device in single stream transport. The circuit device 100 further includes the first buffer 151, the second buffer 152, the clock generation circuit 160, and the image processing circuit 170. In FIG. 19, the first transmission circuit 141 to the fourth transmission circuit 144 and the first output terminal group TG1 to the fourth output terminal group TG4 are not shown. Description of the same components as those in FIG. 18 will be omitted as appropriate.

The image splitting circuit 120 includes the line buffer 121 that buffers the input image data DTIN in one or more horizontal scanning lines. The image splitting circuit 120 outputs the first image data DTA and the second image data DTB by splitting and outputting buffered data in each horizontal scanning line.

The clock generation circuit 160 includes a first clock generation circuit 161 and a second clock generation circuit 162. The image processing circuit 170 includes the first image processing circuit 171 and the second image processing circuit 172. Alternatively, the image processing circuit 170 may only include one of the first image processing circuit 171 and the second image processing circuit 172.

The first clock generation circuit 161 generates the clock signal CKA and the clock signal CKAdiv obtained by dividing the frequency of the clock signal CKA, outputs the clock signal CKA to the first image processing circuit 171, and outputs the clock signal CKAdiv to the switching circuit 130. When the switching circuit 130 splits the first image data PDTA into data with i channels, the frequency division ratio of the clock signal CKAdiv is i.

The second clock generation circuit 162 generates the clock signal CKB and the clock signal CKBdiv obtained by dividing the frequency of the clock signal CKB, outputs the clock signal CKB to the second image processing circuit 172, and outputs the clock signal CKBdiv to the switching circuit 130. When the switching circuit 130 splits the second image data PDTB into data with j channels, the frequency division ratio of the clock signal CKBdiv is j.

Figure 20:
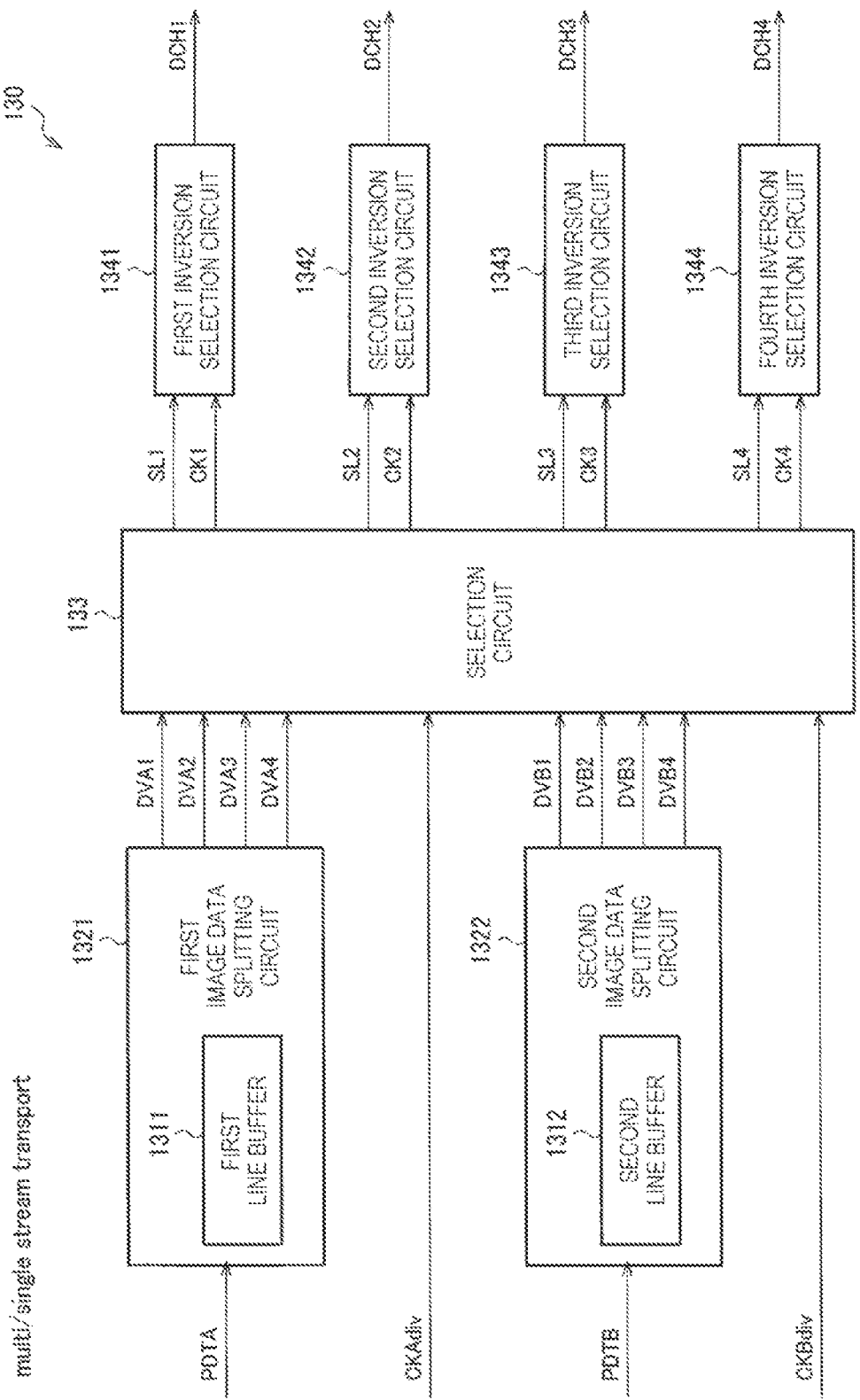
FIG. 20 shows a detailed configuration example of the switching circuit.

FIG. 20 shows a detailed configuration example of the switching circuit. The switching circuit 130 includes a first image data splitting circuit 1321, a second image data splitting circuit 1322, a selection circuit 133, and first to fourth inversion selection circuits 1341 to 1344. The configuration example is common to multi stream transport and single stream transport.

The first image data splitting circuit 1321 splits the first image data PDTA into data DVA1 to DVA4. The splitting number is the number of channels allocated to the first display 210, and is 4 at maximum. The first image data splitting circuit 1321 includes a first line buffer 1311 that buffers the first image data PDTA in one or more horizontal scanning lines. The first image data splitting circuit 1321 outputs the data DVA1 to DVA4 by splitting and outputting buffered data in each horizontal scanning line.

The second image data splitting circuit 1322 splits the second image data PDTB into data DVB1 to DVB4. The splitting number is the number of channels allocated to the second display 220, and is 4 at maximum. The second image data splitting circuit 1322 includes a second line buffer 1312 that buffers the second image data PDTB in one or more horizontal scanning lines. The second image data splitting circuit 1322 outputs the data DVB1 to DVB4 by splitting and outputting buffered data in each horizontal scanning line.

The selection circuit 133 selects, from the data DVA1 to DVA4 and the data DVB1 to DVB4, data SL1 to be output to the first inversion selection circuit 1341. The selection circuit 133 selects, from the clock signal CKAdiv and the clock signal CKBdiv, a clock signal CK1 to be output to the first inversion selection circuit 1341. Similarly, the selection circuit 133 selects, from the data DVA1 to DVA4 and the data DVB1 to DVB4, data SL2 to SL4 to be output to the second inversion selection circuit 1342 to the fourth inversion selection circuit 1344. The selection circuit 133 selects, from the clock signal CKAdiv and the clock signal CKBdiv, clock signals CK2 to CK4 to be output to the second inversion selection circuit 1342 to the fourth inversion selection circuit 1344.

The first inversion selection circuit 1341 outputs channel data based on the data SL1 and the clock signal CK1. FIG. 20 shows an example in which the first inversion selection circuit 1341 outputs the first channel data DCH1. When a signal arrangement order is set to "non-inversion", the first inversion selection circuit 1341 does not invert an arrangement order of lanes for the first output terminal group TG1 and outputs channel data. When a signal arrangement order is set to "inversion", the first inversion selection circuit 1341 inverts an arrangement order of lanes for the first output terminal group TG1 and outputs channel data.

Similarly, the second inversion selection circuit 1342 to the fourth inversion selection circuit 1344 output channel data based on the data SL2 to SL4 and the clock signals CK2 to CK4. FIG. 20 shows an example in which the second inversion selection circuit 1342 to the fourth inversion selection circuit 1344 output the second channel data DCH2 to the fourth channel data DCH4. When a signal arrangement order is set to "non-inversion", the second inversion selection circuit 1342 to the fourth inversion selection circuit 1344 do not invert an arrangement order of lanes for the second output terminal group TG2 to the fourth output terminal group TG4, and output channel data. When a signal arrangement order is set to "inversion", the second inversion selection circuit 1342 to the fourth inversion selection circuit 1344 invert an arrangement order of lanes for the second output terminal group TG2 to the fourth output terminal group TG4 and output channel data.

A correspondence between each inversion selection circuit and a channel is not limited to the correspondence in the example shown in FIG. 20. An example will be described with reference to FIGS. 6 and 16.

When the switching circuit 130 shown in FIG. 20 is applied to FIG. 6, the first image data splitting circuit 1321 splits the first image data DTA into the data DVA1 to DVA3, and the second image data splitting circuit 1322 outputs the second image data DTB as the data DVB1. The selection circuit 133 outputs the data DVA1 and the clock signal CKAdiv to the first inversion selection circuit 1341. Similarly, the selection circuit 133 outputs the data DVA2, DVA3, and DVB1 and the clock signals CKAdiv, CKAdiv, and CKBdiv to the second inversion selection circuit 1342, the third inversion selection circuit 1343, and the fourth inversion selection circuit 1344. In this case, the first inversion selection circuit 1341 outputs the first channel data DCH1. Similarly, the second inversion selection circuit 1342, the third inversion selection circuit 1343, and the fourth inversion selection circuit 1344 output the second channel data DCH2, the third channel data DCH3, and the fourth channel data DCH4.

When the switching circuit 130 shown in FIG. 20 is applied to FIG. 16, the selection circuit 133 outputs the data DVA3 and the clock signal CKAdiv to the first inversion selection circuit 1341. Similarly, the selection circuit 133 outputs the data DVA2, DVA1, and DVB1 and the clock signals CKAdiv, CKAdiv, and CKBdiv to the second inversion selection circuit 1342, the third inversion selection circuit 1343, and the fourth inversion selection circuit 1344. In this case, the first inversion selection circuit 1341 outputs the third channel data DCH3. Similarly, the second inversion selection circuit 1342, the third inversion selection circuit 1343, and the fourth inversion selection circuit 1344 output the second channel data DCH2, the first channel data DCH1, and the fourth channel data DCH4.

Figure 21:
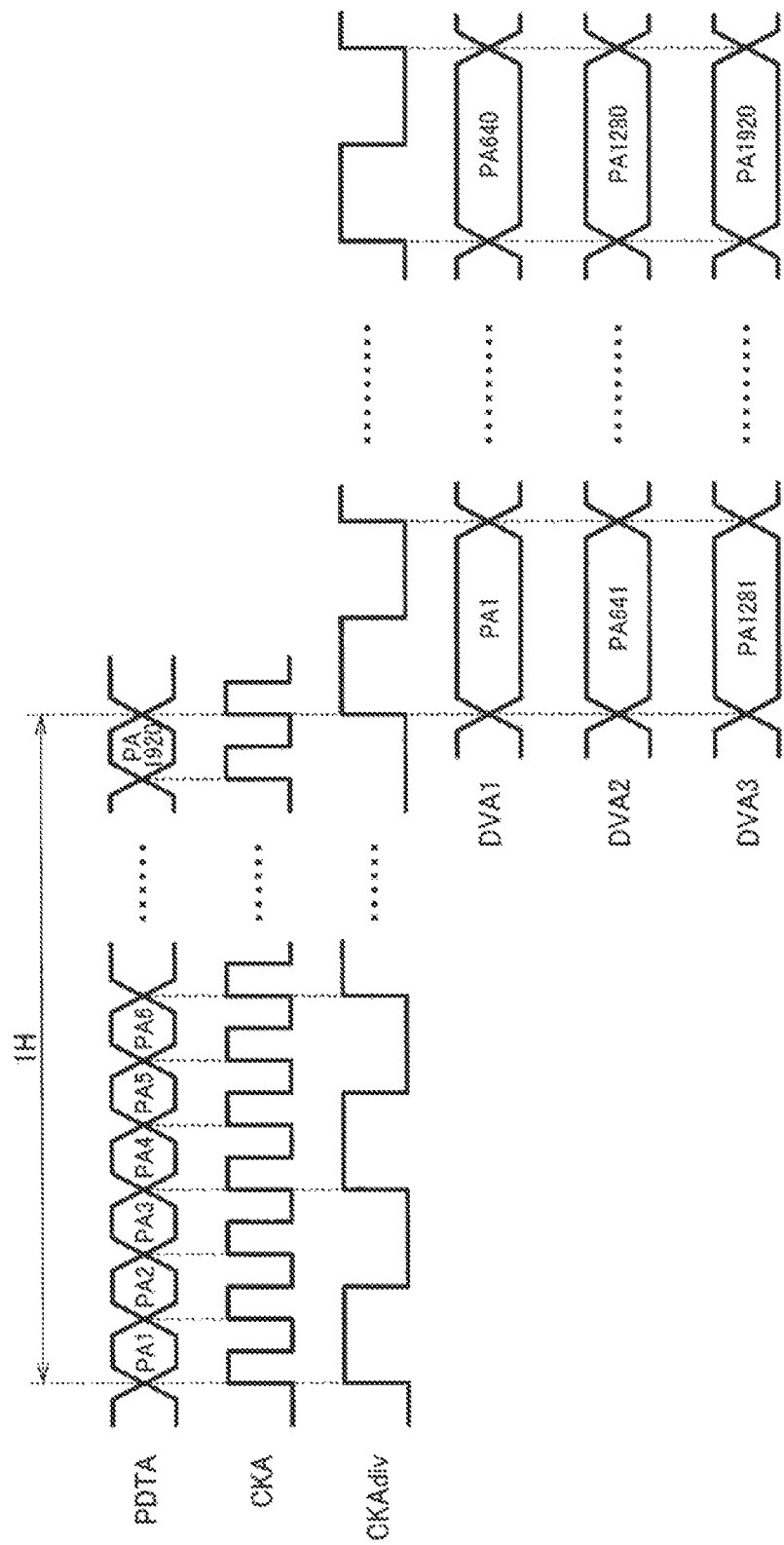
FIG. 21 is a timing chart showing operations of a clock generation circuit and an image data splitting circuit.
Figure 22:
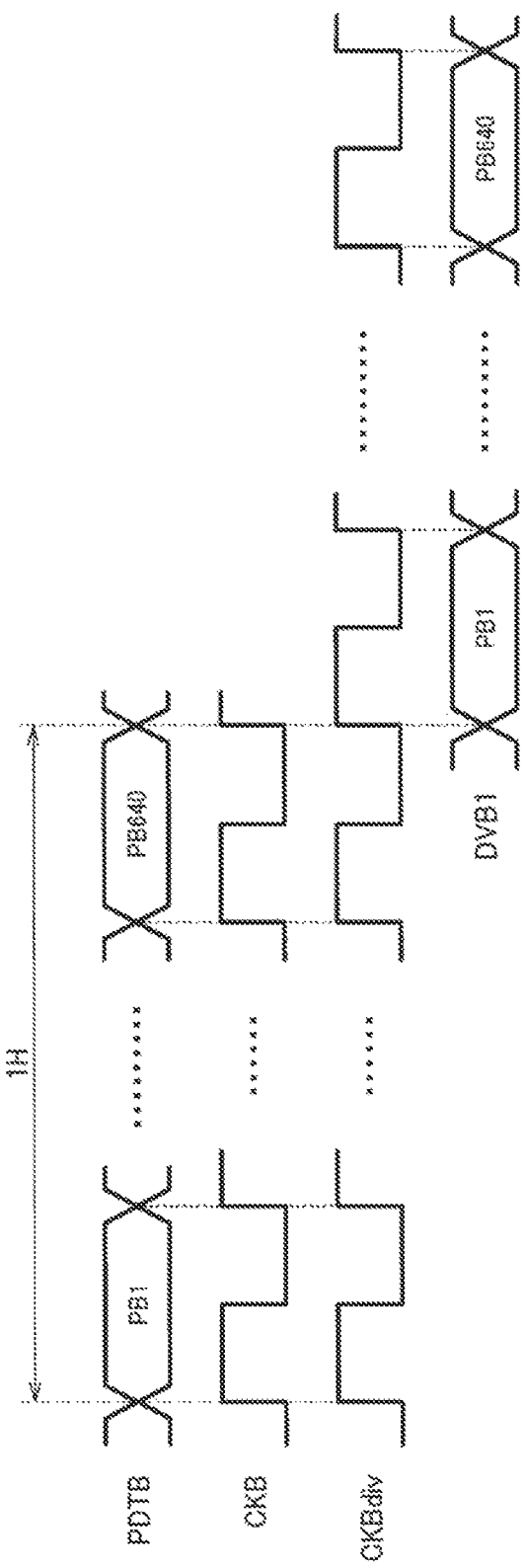
FIG. 22 is a timing chart showing operations of the clock generation circuit and the image data splitting circuit.

FIGS. 21 and 22 are timing charts showing operations of the clock generation circuit and the image data splitting circuit. Here, an example in which the first image data DTA is allocated to the first to third channels, the second image data DTB is allocated to the fourth channel, and a signal arrangement order is set to non-inversion will be described.

As shown in FIG. 21, the clock generation circuit 160 divides the frequency of the clock signal CKA, which is a pixel clock of the first image data PDTA, by three, and outputs the clock signal CKAdiv after the frequency division. The first image data PDTA, the clock signal CKA, and the clock signal CKAdiv are input to the switching circuit 130. The first line buffer 1311 captures pixel data PA1 to PA1920 for one line of the first image data PDTA using the clock signal CKA. The first image data splitting circuit 1321 outputs, from the first line buffer 1311, the pixel data PA1 to PA640 as the data DVA1 in synchronization with the clock signal CKAdiv. Similarly, the first image data splitting circuit 1321 outputs, from the first line buffer 1311, the pixel data PA641 to PA1280 and the pixel data PA1281 to PA1920 as the data DVA2 and the data DVA3 in synchronization with the clock signal CKAdiv. The clock signal CKAdiv corresponds to pixel clocks of the data DVA1 to DVA3.

As shown in FIG. 22, the clock generation circuit 160 outputs the clock signal CKB, which is a pixel clock of the second image data PDTB, as the clock signal CKBdiv. The second image data PDTB, the clock signal CKB, and the clock signal CKBdiv are input to the switching circuit 130. The second line buffer 1312 captures pixel data PB1 to PB640 for one line of the second image data PDTB using the clock signal CKB. The second image data splitting circuit 1322 outputs, from the second line buffer 1312, the pixel data PB1 to PB640 as the data DVB1 in synchronization with the clock signal CKBdiv. The clock signal CKBdiv corresponds to a pixel clock of the data DVB1.

In the embodiment described above, the circuit device 100 includes the image processing circuit 170. The image processing circuit 170 executes image processing on at least one of the first image data DTA and the second image data DTB from the image splitting circuit 120, and outputs image data after the image processing to the switching circuit 130.

According to the embodiment, the image processing corresponding to a display coupled to the circuit device 100 can be executed on at least one of the first image data DTA and the second image data DTB. For example, the image processing circuit 170 can perform a gradation correction, scaling, a color correction, or the like according to specifications or display characteristics of the display.

In the embodiment, the circuit device 100 includes the clock generation circuit 160. The clock generation circuit 160 outputs, to the switching circuit 130, the clock signal CKAdiv obtained by dividing the frequency of the clock signal CKA synchronized with the first image data DTA by i and the clock signal CKBdiv obtained by dividing the frequency of the clock signal CKB synchronized with the second image data DTB by j.

For example, in FIGS. 21 and 22, i=3 and j=1. Alternatively, i may be an integer of 1 or more and n−1 or less, and j may be an integer of 1 or more and n-i or less.

According to the embodiment, the clock generation circuit 160 can output, to the switching circuit 130, the clock signal CKAdiv synchronized with data with i channels obtained by splitting the first image data DTA and the clock signal CKBdiv synchronized with data with j channels obtained by splitting the second image data DTB. Accordingly, the switching circuit 130 can output a clock signal synchronized with image data with each channel to a transmission circuit.

In the embodiment, a transmission clock frequency of the second image data DTB allocated to the j output terminal groups is different from a transmission clock frequency of the first image data DTA allocated to the i output terminal groups.

For example, in FIGS. 21 and 22, the first image data DTA is split into the data DVA1 to DVA3 and allocated to three output terminal groups, and the second image data DTB is allocated to one output terminal group as the data DVB1. At this time, the frequency of the clock signal CKAdiv synchronized with the data DVA1 to DVA3 corresponds to the transmission clock frequency of the first image data DTA. The frequency of the clock signal CKBdiv synchronized with the data DVB1 corresponds to the transmission clock frequency of the second image data DTB. The frequency of the clock signal CKBdiv is ⅓ of the frequency of the clock signal CKAdiv.

Although the embodiment has been described above in detail, it can be easily understood by those skilled in the art that many modifications can be made without substantially departing from novel matters and effects of the present disclosure. Accordingly, all such modifications are included in the scope of the present disclosure. For example, a term described at least once in the specification or drawings together with a different broader or synonymous term can be replaced with the different term anywhere in the specification or drawings. All combinations of the embodiment and the modifications are also included in the scope of the present disclosure. Configurations, operations and the like of a circuit device, a processing device, a display, a display system, and the like are not limited to those described in the embodiment, and various modifications can be made.

What is claimed is:

1. A circuit device comprising:
an image splitting circuit configured to split input image data into first image data to be displayed on a first display and second image data to be displayed on a second display;
a first output terminal group to an n-th output terminal group, n being an integer of 3 or more; and
a switching circuit configured to allocate the first image data and the second image data to the first output terminal group to the n-th output terminal group, wherein
the switching circuit is configured to:
allocate the first image data to any i output terminal groups among the first output terminal group to the n-th output terminal group, and output the first image data from the i output terminal groups to the first display, i being an integer of 1 or more and n−1 or less;
allocate the second image data to any j output terminal groups among output terminal groups obtained by excluding the i output terminal groups from the first output terminal group to the n-th output terminal group, and output the second image data from the j output terminal groups to the second display, j being an integer of 1 or more and n-i or less;
split the first image data into first channel data to i-th channel data;
allocate the first channel data to the i-th channel data of the first image data to a first output terminal group to an i-th output terminal group among the i output terminal groups in a first mode; and
allocate the i-th channel data to the first channel data of the first image data to the first output terminal group to the i-th output terminal group among the i output terminal groups in a second mode,
the first display has a first display resolution, and the second display has a second display resolution,
when the first display resolution is higher than the second display resolution, i is larger than j, and
an arrangement order of lane signals in the second mode in each of the output terminal groups is an arrangement order obtained by inverting an arrangement order of lane signals in the first mode.

2. The circuit device according to claim 1, wherein each of the output terminal groups includes a data lane, or includes a data lane and a clock lane.

3. The circuit device according to claim 1, wherein each of the i output terminal groups includes a plurality of differential output terminals from which differential lane signals are output, and
an arrangement order of a non-inversion signal and an inversion signal of a differential lane signal in the second mode is an arrangement order obtained by inverting an arrangement order of a non-inversion signals and an inversion signals of a differential lane signal in the first mode.

4. The circuit device according to claim 1, wherein the switching circuit is configured to:
split the second image data into (i+1)-th channel data to (i+j)-th channel data;
allocate the (i+1)-th channel data to the (i+j)-th channel data of the second image data to a first output terminal group to a j-th output terminal group among the j output terminal groups in a third mode combined with the first mode or the second mode; and
allocate the (i+j)-th channel data to the (i+1)-th channel data of the second image data to the first output terminal group to the j-th output terminal group among the j output terminal groups in a fourth mode combined with the first mode or the second mode.

5. The circuit device according to claim 1, further comprising:
a first transmission circuit to an n-th transmission circuit configured to output transmission image data to the first output terminal group to the n-th output terminal group based on channel data from the switching circuit and a clock signal.

6. The circuit device according to claim 1, further comprising:
an image processing circuit configured to execute image processing on at least one of the first image data and the second image data from the image splitting circuit and output image data after the image processing to the switching circuit.

7. The circuit device according to claim 1, further comprising:
a clock signal generation circuit configured to output, to the switching circuit, a clock signal obtained by dividing a frequency of a clock signal synchronized with the first image data by i and a clock signal obtained by dividing a frequency of a clock signal synchronized with the second image data by j.

8. A circuit device comprising:
an image splitting circuit configured to split input image data into first image data to be displayed on a first display and second image data to be displayed on a second display;
a first output terminal group to an n-th output terminal group, n being an integer of 3 or more; and
a switching circuit configured to allocate the first image data and the second image data to the first output terminal group to the n-th output terminal group, wherein
the switching circuit is configured to:
allocate the first image data to any i output terminal groups among the first output terminal group to the n-th output terminal group, and output the first image data from the i output terminal groups to the first display, i being an integer of 1 or more and n−1 or less; and
allocate the second image data to any i output terminal groups among output terminal groups obtained by excluding the i output terminal groups from the first output terminal group to the n-th output terminal group, and output the second image data from the i output terminal groups to the second display, i being an integer of 1 or more and n–i or less, the first display has a first display resolution, and the second display has a second display resolution, when the first display resolution is higher than the second display resolution, i is larger than j, and a power supply terminal or a ground terminal is provided between an m-th output terminal group and an (m+1)-th output terminal group among the first output terminal group to the n-th output terminal group, m being an integer of 1 or more and n−1 or less.

9. A circuit device comprising:

an image splitting circuit configured to split input image data into first image data to be displayed on a first display and second image data to be displayed on a second display;

a first output terminal group to an n-th output terminal group, n being an integer of 3 or more; and a switching circuit configured to allocate the first image data and the second image data to the first output terminal group to the n-th output terminal group, wherein the switching circuit is configured to:
  allocate the first image data to any i output terminal groups among the first output terminal group to the n-th output terminal group, and output the first image data from the i output terminal groups to the first display, i being an integer of 1 or more and n−1 or less; and
  allocate the second image data to any i output terminal groups among output terminal groups obtained by excluding the i output terminal groups from the first output terminal group to the n-th output terminal group, and output the second image data from the j output terminal groups to the second display, i being an integer of 1 or more and n-i or less, the first display has a first display resolution, and the second display has a second display resolution, when the first display resolution is higher than the second display resolution, i is larger than i, an m-th output terminal group among the first output terminal group to the n-th output terminal group is arranged on a first side of the circuit device, m being an integer of 1 or more and n−1 or less, and an (m+1)-th output terminal group among the first output terminal group to the n-th output terminal group is arranged on a second side intersecting the first side via a corner portion of the circuit device.

10. The circuit device according to claim 1, wherein each of the first output terminal group to the n-th output terminal group includes a plurality of differential output terminals from which differential signals are output.

11. The circuit device according to claim 1, wherein a transmission clock frequency of the second image data allocated to the j output terminal groups is different from a transmission clock frequency of the first image data allocated to the i output terminal groups.

12. The circuit device according to claim 1, wherein i is equal to j when the first display resolution is same as the second display resolution.

13. The circuit device according to claim 1, wherein the first output terminal group to the n-th output terminal group are arranged side by side in order of the first output terminal group to the n-th output terminal group, and the switching circuit is configured to:
  allocate the first image data to the i output terminal groups arranged continuously side by side among the first output terminal group to the n-th output terminal group; and
  allocate the second image data to the j output terminal groups arranged continuously side by side among the first output terminal group to the n-th output terminal group.

14. A display system comprising:

the circuit device according to claim 1;

a processing device configured to transmit the input image data to the circuit device;

the first display; and the second display.

\* \* \* \* \*